United States Patent
Liu et al.

(10) Patent No.: US 12,199,245 B2
(45) Date of Patent: Jan. 14, 2025

(54) SELF-FORMING SOLID STATE BATTERIES AND SELF-HEALING SOLID ELECTROLYTES

(71) Applicant: The Regents of the University of California, Oakland, CA (US)

(72) Inventors: Ping Liu, San Diego, CA (US); Byoung-Sun Lee, San Diego, CA (US); Xing Xing, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 757 days.

(21) Appl. No.: 16/620,856

(22) PCT Filed: Jun. 11, 2018

(86) PCT No.: PCT/US2018/036970
§ 371 (c)(1),
(2) Date: Dec. 9, 2019

(87) PCT Pub. No.: WO2018/231731
PCT Pub. Date: Dec. 20, 2018

(65) Prior Publication Data
US 2020/0176822 A1   Jun. 4, 2020

Related U.S. Application Data

(60) Provisional application No. 62/517,838, filed on Jun. 9, 2017.

(51) Int. Cl.
*H01M 10/0585* (2010.01)
*H01M 4/36* (2006.01)
(Continued)

(52) U.S. Cl.
CPC ....... *H01M 10/0585* (2013.01); *H01M 4/366* (2013.01); *H01M 4/386* (2013.01);
(Continued)

(58) Field of Classification Search
CPC ......... H01M 10/0562; H01M 10/0585; H01M 2300/0065–0082
See application file for complete search history.

(56) References Cited

U.S. PATENT DOCUMENTS

| 4,278,745 A | 7/1981 | Skarstad et al. |
| 2007/0048610 A1 | 3/2007 | Tsang |

(Continued)

FOREIGN PATENT DOCUMENTS

CN  101494299 A  *  7/2009  ............... C03B 5/06

OTHER PUBLICATIONS

International Search Report and Written Opinion in PCT/US2018/036970, mailed Jan. 7, 2019 (10 pages).
(Continued)

*Primary Examiner* — Stephan J Essex
(74) *Attorney, Agent, or Firm* — Sheppard, Mullin, Richter & Hampton LLP

(57) ABSTRACT

Compositions, manufacturing processes, articles of manufacture, and structures/batteries for self-forming batteries and self-healing solid electrolytes are disclosed. Example embodiments include a self-forming battery. The battery may include a first electrode material and a second electrode material. Assembly of the two electrode materials may result in a chemical reaction that forms an electrolyte layer between the two electrode materials.

10 Claims, 41 Drawing Sheets
(33 of 41 Drawing Sheet(s) Filed in Color)

(51) Int. Cl.
    *H01M 4/38*         (2006.01)
    *H01M 4/40*         (2006.01)
    *H01M 4/485*       (2010.01)
    *H01M 4/587*       (2010.01)
    *H01M 10/052*      (2010.01)
    *H01M 10/056*      (2010.01)

(52) U.S. Cl.
    CPC ............. *H01M 4/387* (2013.01); *H01M 4/40* (2013.01); *H01M 4/485* (2013.01); *H01M 4/587* (2013.01); *H01M 10/052* (2013.01); *H01M 10/056* (2013.01); *H01M 2300/0082* (2013.01)

(56) References Cited

U.S. PATENT DOCUMENTS

| | | | |
|---|---|---|---|
| 2014/0038054 A1* | 2/2014 | Tojigamori | H01M 50/403 |
| | | | 429/231.5 |
| 2015/0303515 A1 | 10/2015 | Pratt et al. | |
| 2016/0344008 A1 | 11/2016 | Eitouni et al. | |
| 2017/0149086 A1* | 5/2017 | Du | H01M 10/0525 |
| 2017/0187063 A1* | 6/2017 | Pistorino | H01M 10/0525 |

OTHER PUBLICATIONS

International Preliminary Report on Patentability in PCT/US2018/036970, issued on Dec. 10, 2019.

* cited by examiner

| Wavenumber (cm$^{-1}$) | Bonding | |
|---|---|---|
| 860 | C-H (aromatic substituted) | |
| 941 | C-S | |
| 990 | C-H | |
| 1002 | C-O | |
| 1100 | C-N or C-OH | |
| 1260 | C-N | |
| 1360 | C-O | |
| 1420 | CH$_2$ | C=N |
| 1490 | Aromatic C=C | |
| 1650 | C=S | |

Fig. 11

| Sample | Exposed ambient for 5 days (0.2 N/mm sample) | Exposed ambient for 1h (gauge 2 mm sample) |
|---|---|---|
| Modulus (MPa) | 226.1 | 13.5 |
| Ultimate tensile stress (MPa) | 6.80 | 0.90 |
| Maximum strain (%) | 7.40 | 22.99 |

Fig. 13

| Sample | #1 | #2 | #3 | #4 |
|---|---|---|---|---|
| Modulus (MPa) | 97.7 | 356.2 | 85.0 | 204.7 |
| Ultimate tensile stress (MPa) | 1.895 @ 1.94% strain | 23.146 @ 8.72% strain | 4.106 @ 4.83% strain | 16.129 @ 10.93% strain |
| Breaking strain (%) | N/A | 10.06 | N/A | 11.44 |

Fig. 15

SELF-FORMING SOLID STATE BATTERIES AND SELF-HEALING SOLID ELECTROLYTES

CROSS-REFERENCE TO RELATED APPLICATIONS

The present application is a U.S. National Phase under 35 U.S.C. § 371 of International Application No. PCT/US2018/036970, filed on Jun. 11, 2018, which claims priority to U.S. Provisional Patent Application No. 62/517,838, filed on Jun. 9, 2017, the contents of which are incorporated herein by reference in their entirety.

STATEMENT REGARDING FEDERALLY SPONSORED RESEARCH OR DEVELOPMENT

This invention was made with government support under DE-AR0000781 awarded by the Department of Energy. The government has certain rights in the invention.

TECHNICAL FIELD

The present disclosure is generally related to solid state batteries. In particular, embodiments of the present disclosure relate to self-forming solid state batteries and processes for making the same.

BACKGROUND

Solid state batteries are desirable over existing commercial Li-ion batteries due to their improved safety and energy densities. They are substantially free of combustible materials and can use alkaline metals as anodes (which do not cycle and are safety hazards in today's batteries), thus leading to higher energy densities. Currently, Li metal is generally assembled with a thin solid electrolyte sheet to form parts of a battery. Such an approach has the multiple following challenges: 1) the electrolyte layer is not mechanically robust at the desired thickness; 2) a stand-alone ceramic sheet needs to cost <10 \$/m$^2$ for a Li metal battery to reach cost parity with Li-ion; 3) current solid electrolytes usually require high temperature processing; and 4) Li dendrites are known to grow along grain boundaries, leading to cell failure.

BRIEF DESCRIPTION OF THE EMBODIMENTS

The details of some exemplary embodiments of the methods and systems of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

Disclosed are compositions, manufacturing processes, articles of manufacture and structures/batteries that pertain to a new class of self-forming solid-state batteries and self-healing solid electrolytes. Self-forming batteries, are batteries in which a highly reductive metal, e.g. Li, Na, K, etc., reacts with another material which forms a layer between said material and said metal. The layer can conduct ions derived from the metal. The resulting structure of metal/electrolyte/material effectively forms a complete battery capable of rechargeable operation. Some embodiments include compositions of solutions that serve as precursors for forming solid state batteries and processes of using these liquid precursors to manufacture solid state batteries. The compositions of the liquid precursors result in the formation of electrolyte and electrode layers of desired thickness, microstructure, conductivity, charge storage capacity, among other attributes. The resulting batteries can offer inherent safety that is substantially free of combustible organic solvents and high energy density of >1000 Wh/L, twice of current Li ion batteries. Self-healing solid electrolytes can suppress dendrite growth and enable stable Li cycling in batteries.

In further embodiments, a solution or slurry is directly deposited on an electrode surface. Removal of the solvent results in the formation of a film. For example, a coating solution is prepared by dispersing Li disulfide ($Li_2S$) and S with a molar ratio of 1 to 5 in tetra ethylene glycol dimethyl ether (TEGDME) at a solid loading of 10%; the liquid is stirred, dissolving the solids to form a dark red Li polysulfide solution; and phosphorous pentasulfide ($P_2S_5$) is added to produce a ratio of 3 $Li_2S_6$ to $P_2S_5$. To prepare the electrolyte film: the coating solution is applied to the surface of a freshly rolled Li metal foil at a loading of 1 ml/cm$^2$; the sample is allowed to dry; after the film solidifies, the sample is evacuated at 140° C. to completely remove the solvent to obtain an electrolyte coating on the Li surface.

In an exemplary embodiment, the in-situ making of a polymer-inorganic composite electrolyte is based on the S vulcanization mechanism to enhance the mechanical strength of the solid electrolyte. Vulcanization is the S based cross-linking of the polymer, and the excessive S atoms in the sulfide electrolyte are used for this reaction.

In accordance with aspects of the present disclosure, a self-forming battery is disclosed. The battery includes two electrode materials. Assembly of the two electrode materials may result in a chemical reaction that forms an electrolyte layer between the two electrode materials.

In embodiments, a first electrode includes alloys of alkali and alkali-earth reductive metals.

In embodiments, the second electrode stores at least one of graphite, hard carbon, $Li_4Ti_5O_{12}$, Si, Sn, and Al.

In embodiments, the self-forming battery further includes a material to react with the reductive metal. The material may include at least one of oxyhalide, S containing compound, carbon halide, nitrate, metal halide, sulfides, mixed sulfides, and metal nitrates.

In embodiments, the electrolyte layer includes an ionic conductor.

In embodiments, the self-forming battery includes $xLi_2S_{1-y}$:$P_2S_5$. x ranges from 1 to 5, and y ranges from 0 to 7.

In embodiments, x ranges from 7/3 to 3, and y ranges from 0 to 0.5.

In embodiments, the self-forming battery further includes compounds. The compounds include LiI, LiBr, LiCl, $LiNO_3$, $LiNO_2$, and LiF.

In embodiments, the self-forming battery further includes a cross linkable polymer in a catholyte layer.

In embodiments, the cross linkable polymer is created by a vulcanization reaction between cathode materials and polymer chain.

In embodiments, the cross linkable polymer includes a ratio more than 0.01 wt % and less than 99.99 wt %.

In embodiments, the self-forming battery further includes a solvent including at least one of TEGDME, DME, and DEGDME.

Additional aspects of the present disclosure relate to a method. The method includes producing self-forming batteries. The method also include exposing a metal to a solution of an oxidant for a period of time. The method includes rendering the metal free from solvents. The method includes attaching the metal to a conducting current collector.

In embodiments, the conducting current collector includes at least one of Ti, Al, and C.

In embodiments, the method further includes obtaining a structure including a metal and an electrolyte. The structure is used in combination with a cathode.

In embodiments, the method further includes exposing the metal with a thermal treatment including an electrochemical treatment where a cyclic current is applied to promote electrolyte layer growth.

Additional aspects of the present disclosure relate to a method. The method includes producing self-forming batteries. The method further includes disposing a solid electrolyte interphase onto an anode. The method includes disposing a solid electrolyte separator onto the solid electrolyte interphase. The method also includes disposing activate material onto the solid electrolyte separator.

In embodiments, the method further includes placing a washer between the solid electrolyte interphase and the solid electrolyte separator.

In embodiments, the solid electrolyte separator is disposed within the washer.

In embodiments, the anode is a Li chip.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 11 illustrates different bonds formed at different wavenumbers, in accordance with one embodiment of the present disclosure.

FIG. 13 illustrates stresses and strains of samples subject to different environments, in accordance with one embodiment of the present disclosure.

FIG. 15 illustrates stresses and strains of samples subject to different environments, in accordance with one embodiment of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Disclosed are self-forming batteries, embodiments of which can be implemented to improve safety and energy densities as compared to conventional solutions. In various embodiments, the batteries are substantially free of combustible materials and can be configured to include alkaline materials as anodes and lead to higher energy densities. In some embodiments, the batteries may be formed by compositions of solutions that serve as precursors for forming solid state batteries. In embodiments, an electrolyte in the batteries may be a polymer-inorganic composite electrolyte formed in-situ that is based on a S vulcanization mechanism.

In embodiments, the self-forming batteries may include a highly reductive metal, such as Li, Na, K, etc. which may react with another material to form a layer between the metal and the material. The formed layer can conduct ions derived from the metal. The electrolyte layer may be self-healing, as will be described herein. The resulting metal/electrolyte/material structure may effectively form a complete rechargeable battery.

In embodiments, the self-forming batteries may include electrode materials and ionic conductors. Electrode materials, such as those that are capable of reacting with the reductive metals may include, for example, oxyhalides (e.g., $LiXO_3$ and $LiXO_2$ where X=Cl, Br, I), S containing compounds (e.g., $SO_2$, $SOCl_2$), carbon halides (e.g., $CF_x$ where $0<x<1$), nitrates (e.g., $LiNO_3$), metal halides and oxyhalides (e.g., $FeF_3$, $FeF_2$, $CoF_2$, $CuF_2$, or combinations thereof), sulfides (e.g., $Li_2S_n$ (n=2–8)), mixed sulfides (e.g., $Li_2S_n + P_2S_5$), and metal nitrates ($LiNO_3$, $FeNO_3$, and other or combinations of).

By using oxidative materials as solutions or vapors to react with metal to synthesize ion conductors on its surface, synthesis conditions can be controlled so that films with a desired composition, morphology, structure, and thickness can be deposited. Accordingly, embodiments can be implemented that: 1) eliminate the need for a stand-alone separator, a major cost and performance barrier; 2) automatically screen for compatibility with the metal; 3) use metals with complex geometries in solid-state batteries; and 4) provide a self-healing electrolyte if excess oxidants are maintained in the system.

Figure 3:
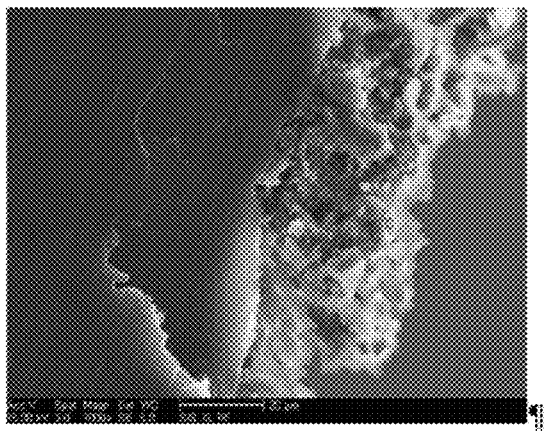
FIG. 3 illustrates different images of a catholyte coating, in accordance with one embodiment of the present disclosure.
Figure 3:
Figure 3:
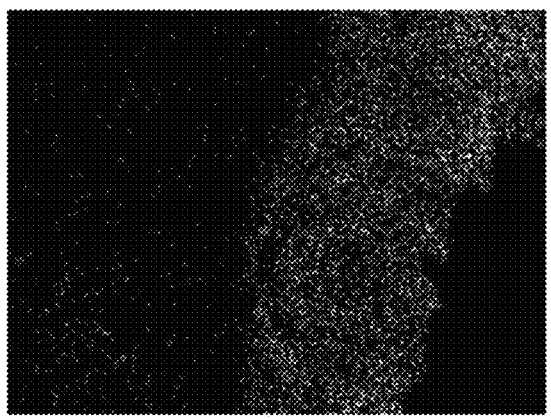

In embodiments, the synthesis may result in a coating of about five microns with a conductivity of about $10^{-4}$ S/cm that will offer a resistance of about 5 Ohm/cm². For example, a catholyte coating may form a solid state Li/S battery based on a reaction between Li and a solution of $Li_2S_6/P_2S_5$. FIG. 3 more clearly illustrates the coating in a scanning electron microscope (SEM) image and an energy-dispersive X-ray spectroscopy (EDS) mapping of the cross section of the coating. The sample was prepared by soaking Li metal in of $Li_2S_6/P_2S_5$ (1:1 in tetraethylene glycol dimethyl ether (TEGDME)) solution for a week, and pumped overnight at 120 degrees C.

Figure 4:
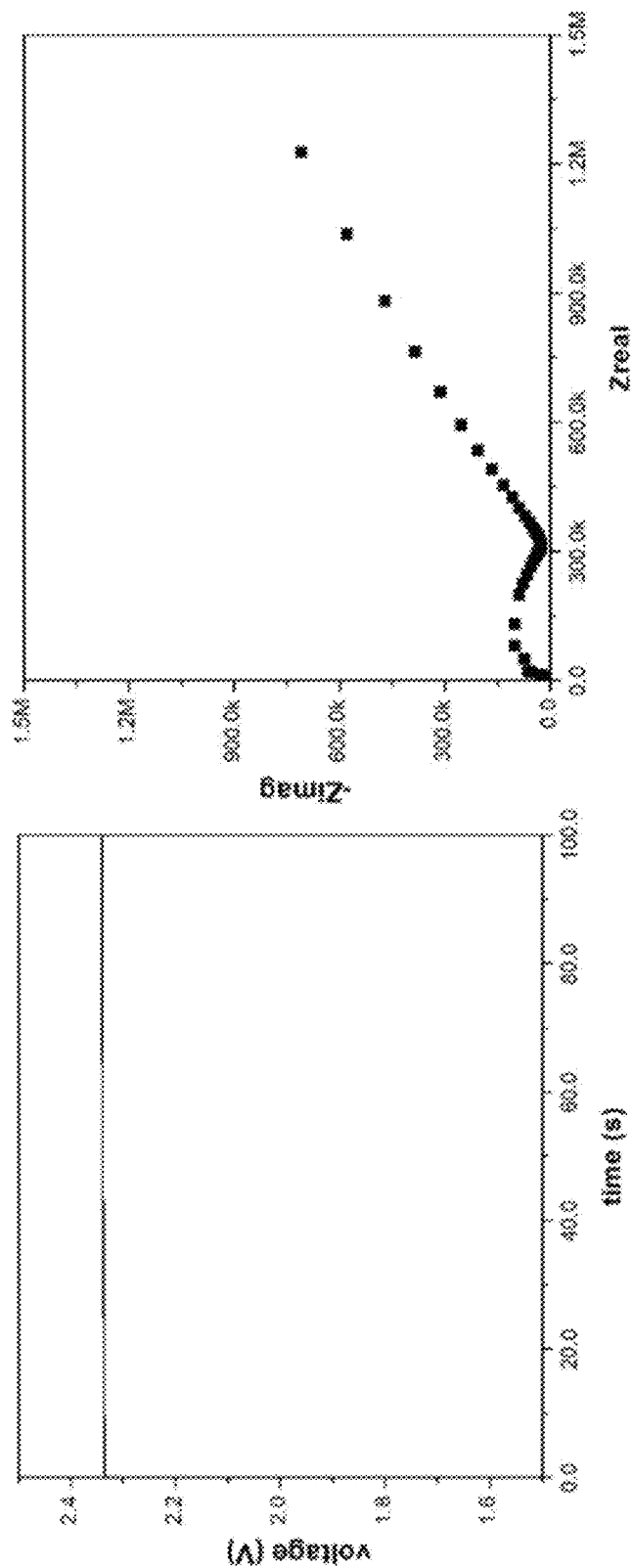
FIG. 4 illustrates the open circuit voltage and electrochemical impedance spectroscopy (EIS) for semi-slid coated Li, in accordance with one embodiment of the present disclosure.

FIG. 4 illustrates an open circuit voltage (OCV) and electrochemical impedance spectroscopy (EIS) for a semi-solid coated Li. The sample was prepared by soaking Li metal in of Li2S6/P2S5 (1:1 in TEGDME) solution for a week, and evacuated under a vacuum overnight at 55 degrees C., which removed a majority of TEGDME solvents. As illustrated, the graph depicts a stable 2.34 V with a 300 kiloohm impedance.

In some embodiments, the reaction product formed between the metal and the residual oxidants may include the following, where Li is used only as an example: $Li/Li_2S_n + P_2S_5$, where the reaction product is $Li_3PS_4$; $Li/SOCl_2$, where the reaction product is doped LiCl; $Li/SO_2$, where the reaction product is $Li_2S_2O_4$; $Li/FeF_3+AlF_{3y}$, where the reaction product is $LiAlF_4$; $Li/LiFePO_4$, where the reaction product is $Li3PO_4$; and $Li/I_2$+PAN-S, where $I_2$ is in the form of a complex with PV2P (polyvinyl2pyrolidone), PAN-S is a compound formed by reacting polyacrylonitrile (PAN) with S at a weight ratio of 1:10 to 10:1 at a temperature between about 300° C. to about 600° C.

The process for forming the self-forming batteries may include: 1) an operation where the metal is exposed to a solution of the oxidant for a period of time, removed from the solution, rendered substantially free of solvents, and attached to a conducting current collector, such as a metal, Ti, Al, C, etc. to form a complete battery; 2), similar to 1), except the metal after reaction may be rendered free of residual oxidant materials so that a metal/electrolyte structure is obtained. This structure can be used in combination with different cathodes known in the state of the art; and 3)

similar in 1) where the exposure includes thermal treatment and electrochemical treatment, where a cyclic current is applied to promote electrolyte layer growth.

In embodiments, compositions of solutions may serve as precursors for forming the batteries. The compositions of the precursors may result in the formation of electrolyte and electrode layers of a desired thickness, microstructure, conductivity, and charge storage capacity, among other attributes. The resulting batteries can offer inherent safety that is substantially free of combustible organic solvents, while providing high energy density of >1000 Wh/L, about twice the energy density of existing Li ion batteries. The resulting self-healing solid electrolytes may suppress dendrite growth and enable stable Li cycling in the batteries.

In embodiments, solution-based processing may be used to form the film. By solution-based processing, a solution or slurry can be directly deposited on an electrode surface. Removal of the solvent results in the formation of a film. Solution-based processing may reduce costs, may be used to form thin films, and can form complex, multilayer coatings. Costs may be reduced because liquid is coated on a metal substrate to then dry. Another step involves either thermal treatment or mechanical processing. In contrast, solid processing uses powder materials that are usually prepared by mechanical milling, followed by pressing and sintering the powder at elevated temperatures, which increases cost and production time.

In some embodiments, the disclosed solution-based processing is able to form thin films. The ionic resistance of films may directly scale with their thickness. Solution-based processing naturally lends itself to thin film formation, while ceramic powders usually form thick films or pellets using direct pressing or slurry casting. Direct formation of films on substrates eliminates the need for fabricating freestanding films which require minimum thickness to be mechanically robust.

In embodiments, the solution-based processing may be used to form complex multilayer coatings. Not only can complex shapes be accommodated because of solution-based processing, multiple coatings may be deposited that each may serve a different purpose. This is otherwise very difficult and expensive to achieve, as vacuum-based deposition techniques would be required for solid material synthesis and high temperature ceramic processing.

In some embodiments, after the electrolyte layer is formed, excess oxidants left on the surface can be partially reduced, chemically, to form another electrolyte layer. The reserve oxidant between the two electrolyte layers can be released and may react with the metal in the event of a crack or Li dendrite penetration. The self-healing electrolyte layer may aid in long term durability of the batteries.

In some embodiments, a coating solution may be prepared by dispersing Li disulfide and S with a molar ratio of 1 to 5 in tetra ethylene glycol at a solid loading of 10%. The liquid may be stirred, dissolving the solids to form a dark red Li polysulfide solution. Phosphorous pentasulfide may be added to produce a ratio of about 3 moles $Li_2S_6$ to about 1 mole $P_2S_5$.

In some embodiments, to prepare the electrolyte film the coating solution described above may be applied to the surface of a freshly rolled Li metal foil at a loading of about 1 ml/cm². The sample may be dried, and after the film solidifies, the sample may be evacuated at 140 degrees C. to completely remove the solvent to obtain an electrolyte coating on the Li surface.

In embodiments, the ratio between Li, P, and S can be adjusted. A desired general composition may be $xLi_2S_{1+y}$: $P_2S_5$, where X may range from about 1 to about 5. In some embodiments, a narrower range may be appropriate (e.g., from about 2 to about 3 or from about 7/3 to about 3). Y may range from about 0 to about 7. In some embodiments, a narrower range may be appropriate (e.g., from about 0 to about 1 or about 0 to about 0.5).

In embodiments, additional compounds may be added to the solution, for example, LiI, LiBr, LiCl, $LiNO_3$, $LiNO_2$, and LiF, that might serve to increase the ionic conductivity. In some embodiments, suitable solvents may include dimethyl ether, diethyl ether, dimethoxy ethane (DME), TEGDME, diethylene glycol dimethyl ether (DEGDME), tetrahydrofuran (THF), N,N-dimethylformamide (DMF), and N-methylformamide (NMF).

In embodiments, in addition to applying the solution on the surface of the Li electrode, dip coating or spin coating can be employed to control film thickness and morphology. Temperature during deposition can vary from about −20 to about 140 degrees C., and preferably about 10 to about 60 degrees C.

In embodiments, the solution-based process can be used to deposit Li-containing materials. Similar solution chemistries are also applicable to Na solution chemistries.

In embodiments, the self-forming batteries may include an assembly of two electrode materials to complete a battery structure without an electrolyte layer by a reaction between the two electrode materials. Additionally, the battery structure may include an anode that includes one or alloys of alkali (e.g., Li, Na, K, and Cs, etc.) and alkali-earth (e.g., Be, Mg, Ca, and Sr, etc.) reductive metal used as an anode. Furthermore, the anode may include material that can store (e.g., intercalate or alloy) graphite, hard carbon, $Li_4Ti_5O_{12}$, Si, Sn, Al, etc.

In some embodiments, a material may be capable of reacting with the reductive metal. The material may include oxyhalides (e.g., $LiXO_3$, $LiXO_2$ where X includes Cl, Br, and I); S containing compounds, which may include $SO_2$ and $SOCl_2$; carbon halides, which may include $CF_x$ where $0<=<1$; nitrates, which may include $LiNO_3$; metal halides and oxyhalides, which may include $FeF_3$, $FeF_2$, $CoF_2$, $CuF_2$, and combinations thereof; sulfides, which may include $Li_2S_n$, (n=2–8); mixed sulfides, which may include $Li_2Sn+P_2S_5$ (n=2–8); and metal nitrates, which may include $LiNO_3$, $FeNO_3$, and/or combinations thereof.

In embodiments, the reacted electrolyte layer, by way of example only, may be an ionic conductor (e.g., $Li/Li_2S_n+P_2S_5$ (n=2–8) where the reaction product may be $Li_3PS_4$). In embodiments, the ionic conductor may be $Li/SOCl_2$, where the reaction product is doped LiCl. In some embodiments, the ionic conductor may be $Li/SO_2$ and the reaction product is $Li_2S_2O_4$. In embodiments, the ionic conductor may be $Li/FeF_3+AlF_3$, where the reaction product is $LiAlF_4$. In some embodiments, the ionic conductor may be $Li/LiFePO_4$, where the reaction product is $Li_3PO_4$. In embodiments, the ionic conductor may be $Li/I_2+PAN-S$, where $I_2$ is in the form of a complex with PV2P (polyvinyl2pyrolidone) and PAN-S is a compound formed by reacting PAN with S at a weight ratio of about 1:10 to about 10:1 and at a temperature between about 300 to about 600 degrees C.

In some embodiments, the self-forming battery may include a robust catholyte layer. By way of example, the catholyte layer may be a cross-linkable polymer such as PAN, Stryene-Butadiene rubber (SBR), Acrylonitrile-Butadiene-Styrene rubber (ABS), etc. that may be used as reinforcement. The cross-linkable polymer may be created by a vulcanization reaction between cathode materials and polymer chain. By way of example only, the ratio of the cross-linkable polymer may be more than about 0.01 wt % and less than about 99.99 wt %. Additionally, by way of further example only, the vulcanization reaction may be conducted between about −20 to about 200° C. Furthermore, the solvent used in the reaction may include various ether (e.g., TEGDME, DME, and DEGDME), but is not limited to these exemplary listings.

Embodiments also include a process for creating self-forming batteries. By way of example only, the process may include a single step where the metal is exposed to a solution of the oxidant for a period of time, the metal is removed from the solution, the metal is then rendered substantially free of solvents, and the metal is attached to a conducting current collector, such as Ti, Al, C, etc. to form a complete battery.

Additionally, by way of example, another exemplary process may include ensuring that a structure of metal/electrolyte is obtained. This structure can be used in combination with any cathode known in the state of the art. Furthermore, the process may include thermal treatment, such as electrochemical treatment where a cyclic current is applied to promote electrolyte layer growth.

Further embodiments may also include the formation of self-healing solid electrolytes that can suppress dendrite growth and enable stable Li cycling. These layers, which may be low-cost, low-resistance, and mechanically robust, can b e formed directly on Li metal surfaces by facile reactions between Li and an oxidant solution. In addition, these electrolytes may have self-healing capabilities due to built-in reserve oxidants that can react with Li metal if the original electrolyte layer is compromised during repeated cycling.

Figure 1:
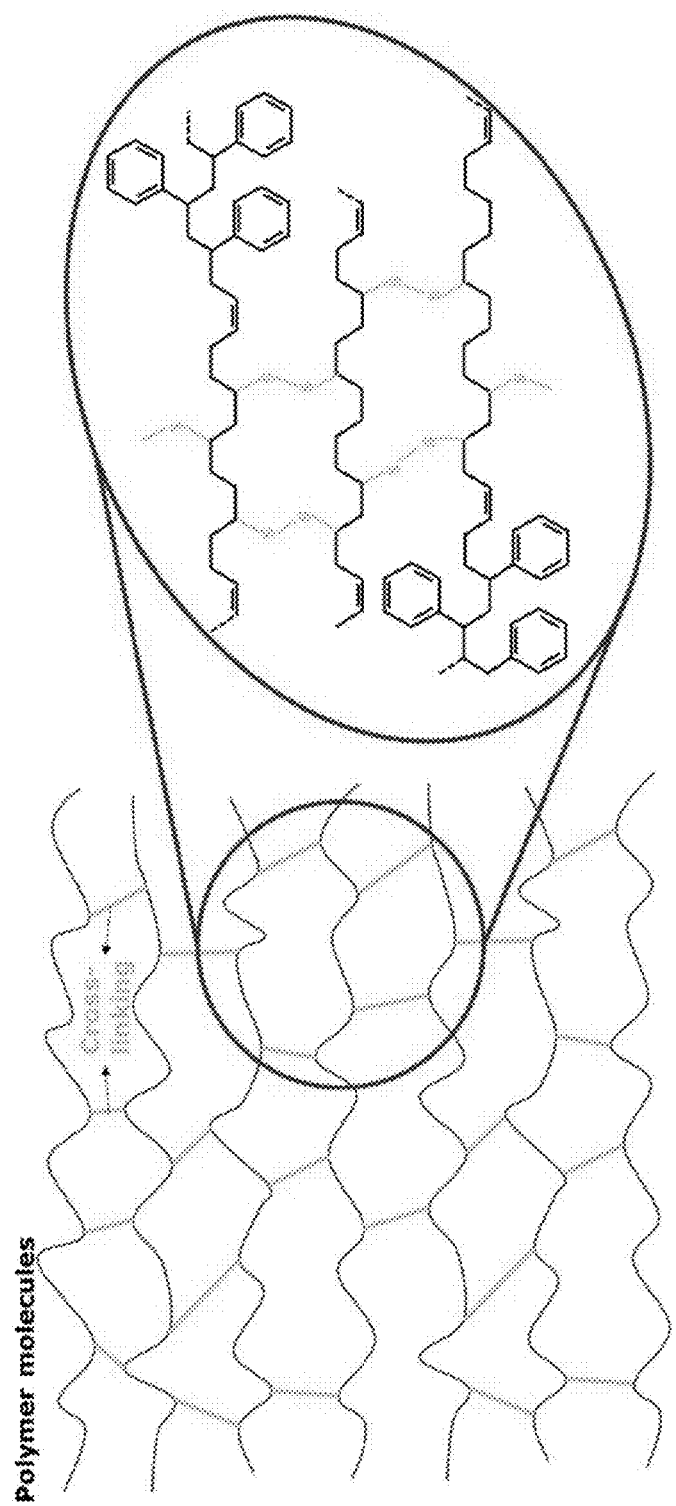
FIG. 1 illustrates cross-linked polymer based on the vulcanization mechanism in accordance with one embodiment of the present disclosure.

In further embodiments, polymer-inorganic composite electrolyte can be made in-situ based on a S vulcanization mechanism for enhancing the mechanical strength of the solid electrolyte. In embodiments, the vulcanization is the S based cross-linking of the polymer, as illustrated in FIG. 1, in which the excessive S atoms in the sulfide electrolyte are used for this reaction.

The inorganic solution or slurry may include sulfide electrolyte particles or precursors, excessive S dissolved in organic solvent, and a separately prepared cross-linkable polymer/organic solvent solution. The solutions may be mixed before casting since the excessive S can vulcanize the polymer immediately. The mixed solution is finally casted on various substrates for different purposes (e.g., the Li metal to make a good interface between solid electrolyte and Li surface or on an inert surface to make a free-standing solid electrolyte layer). The solution-based solid electrolyte synthesis results in a mechanically robust, flexible, and stretchable composite electrolyte layer with desirable thickness and conductivity. In addition, the S network formed in polymer chain by vulcanization provides Li ion conductivity.

In embodiments, the in-situ formed polymer-inorganic composite electrolytes may provide the following advantages over conventional solutions, which mainly involve inorganic solid electrolytes and polymeric fiber reinforced inorganic composite electrolytes. A first advantage that may be achieved is mechanical robustness. The in-situ cross-linked polymer may provide a tight binding between the inorganic electrolyte and results in the improved mechanical performance. On the other hand, the prepared electrolyte powder based pelletizing and subsequent annealing process, or nonwoven polymeric fiber-reinforced solid electrolyte, shows a clear grain boundary, which can be the source of mechanical failure.

Second, the in-situ cross linked polymer may provide low processing cost and easy preparation. This is because the preparation of the inorganic solid electrolyte from the precursors and the formation of polymer-inorganic solid electrolyte composite are simultaneously achieved in one process. Meanwhile, existing methods require separated and step-wise multiple processing (e.g., the solid electrolyte material synthesis, solid electrolyte pellet or layer preparation, and/or further heat treatment for annealing). The reduced number of processing steps offers low processing cost. Additionally, the in-situ cross-linked polymer provides scalability. This is because conventional solutions are based on solid electrolyte particles that are limited in the ability to scale-up to large areas due to quality control for uniformity and defect-free conditions for large areas.

By way of example, embodiments of the disclosed in-situ formed polymer-inorganic composite electrolytes may require two separate solutions that are first prepared. For example, the inorganic precursor solution consisting of organic solvent-soluble inorganic solid electrolyte precursors may include $L_2S$, $P_2S_5$, excessive S, and the vulcanizable polymer/organic solvent solution. In embodiments, the cross-linking may immediately onset when the S excessive S and vulcanizable polymer mix together. The total reaction time may be decided by the polymer species, ratio between S and polymer, concentration, temperature, etc. Therefore, two solutions may be mixed right before casting. Provided below are two exemplary solutions.

Figure 2:
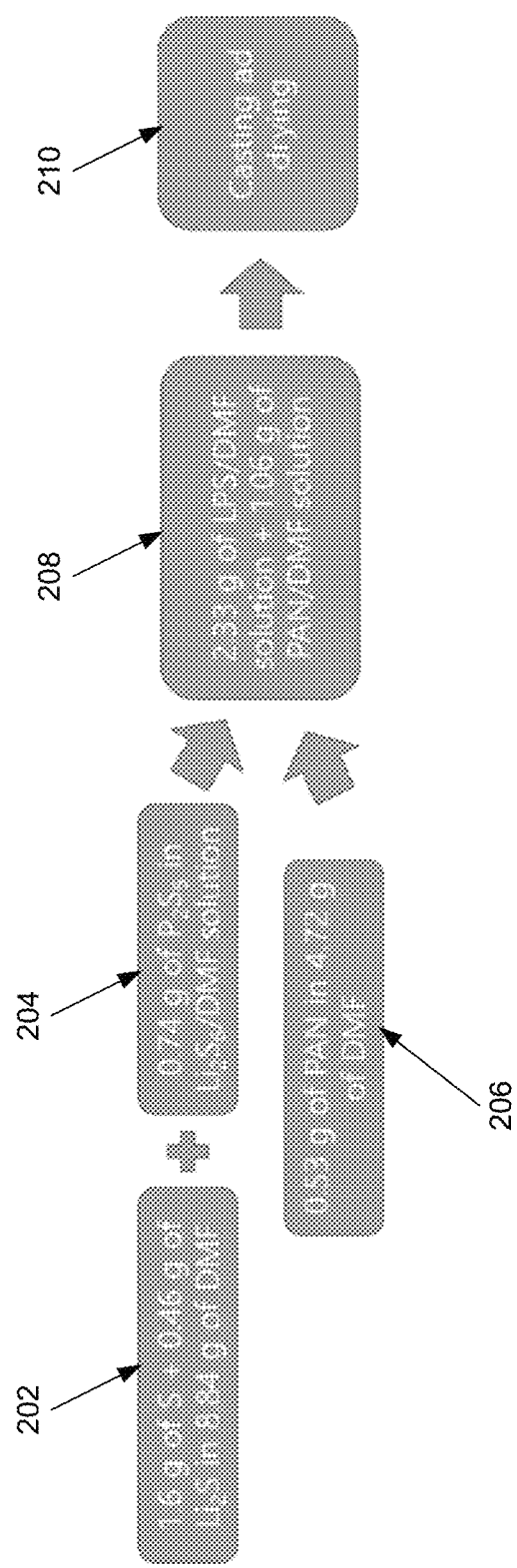
FIG. 2 illustrates a procedure for preparing the in-situ polymer inorganic solid electrolyte layer in accordance with one embodiment of the present disclosure.

In one example, a LPS-PAN composite solid electrolyte may be formed: In order to prepare Li thiophosphate (LPS) solid electrolyte composited with PAN and DMF has been employed as the common solvent for dissolving both solutes. 1.6 g of S, 0.46 g of $Li_2S$, and 0.74 g of $P_2S_5$ in 8.84 g of DMF to make S excessed LPS solution, while 10 wt % PAN/DMF solution was prepared. The solution was mixed with 2.33:1.06 ratio to make the film. The solution was casted on Li or teflon and dried. This is also shown in FIG. 2, which illustrates a procedure to prepare the in-situ polymer inorganic solid electrolyte layer.

In another example, LPS-SBR composite solid electrolyte may be formed: For synthesizing the composite electrolyte, THF was used as the common solvent. The process may be similar to that described in FIG. 2, except 10 wt % SBR/THF solution is prepared. For the inorganic compound, any sulfide electrolyte precursor can be used, and any vulcanizable or cross-linkable polymer can be employed for this invention. Moreover, the organic solvents may include various ethers (e.g., TEGDME, DME, and DEGDME).

Figure 5:
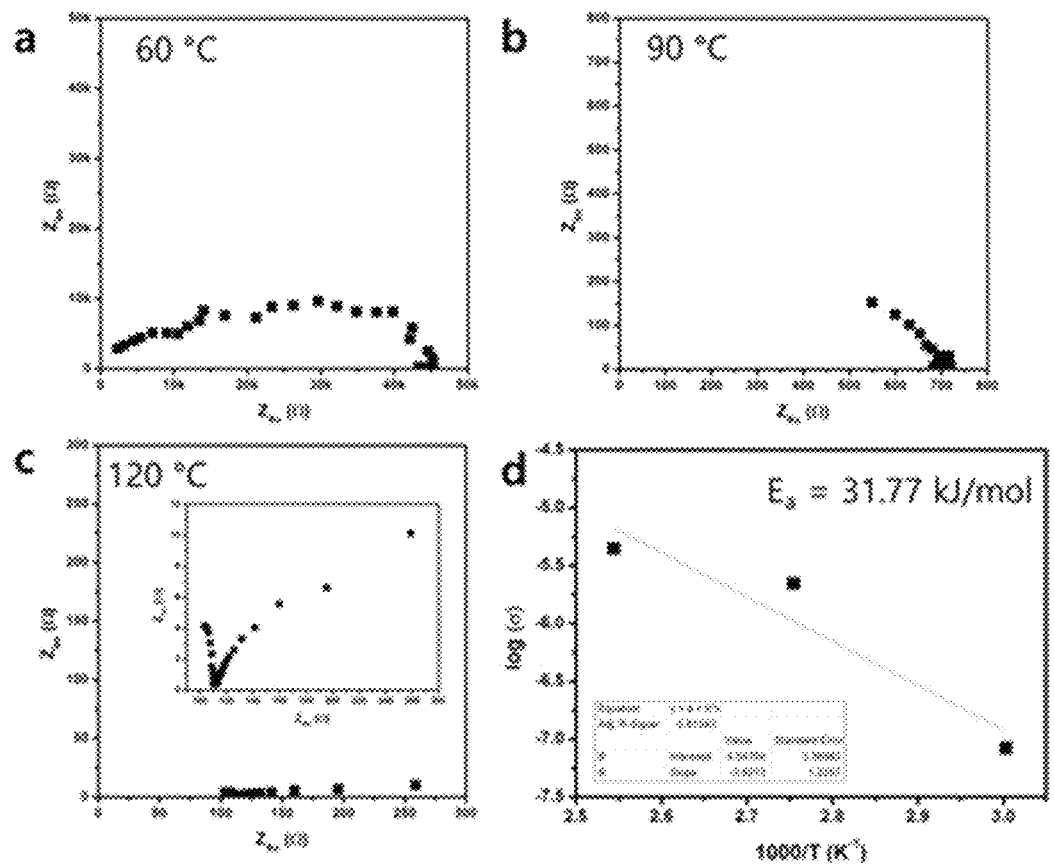
FIG. 5 illustrates EIS curves of free-standing in-situ polymer-inorganic solid electrolyte layers at different temperatures and a corresponding activation energy, in accordance with one embodiment of the present disclosure.

FIG. 5 illustrates EIS curves of free-standing in-situ polymer-inorganic solid electrolyte layers at different temperatures and a corresponding activation energy, in accordance with one embodiment of the present disclosure. The EIS curves indicate reducing impedance as temperature rises for a free-standing in-situ polymer-inorganic solid electrolyte layer (e.g., a Li/SE/Li symmetric cell). Based on these EIS curves, an activation energy may be estimated to be about 31.77 kJ/mol.

Figure 6:
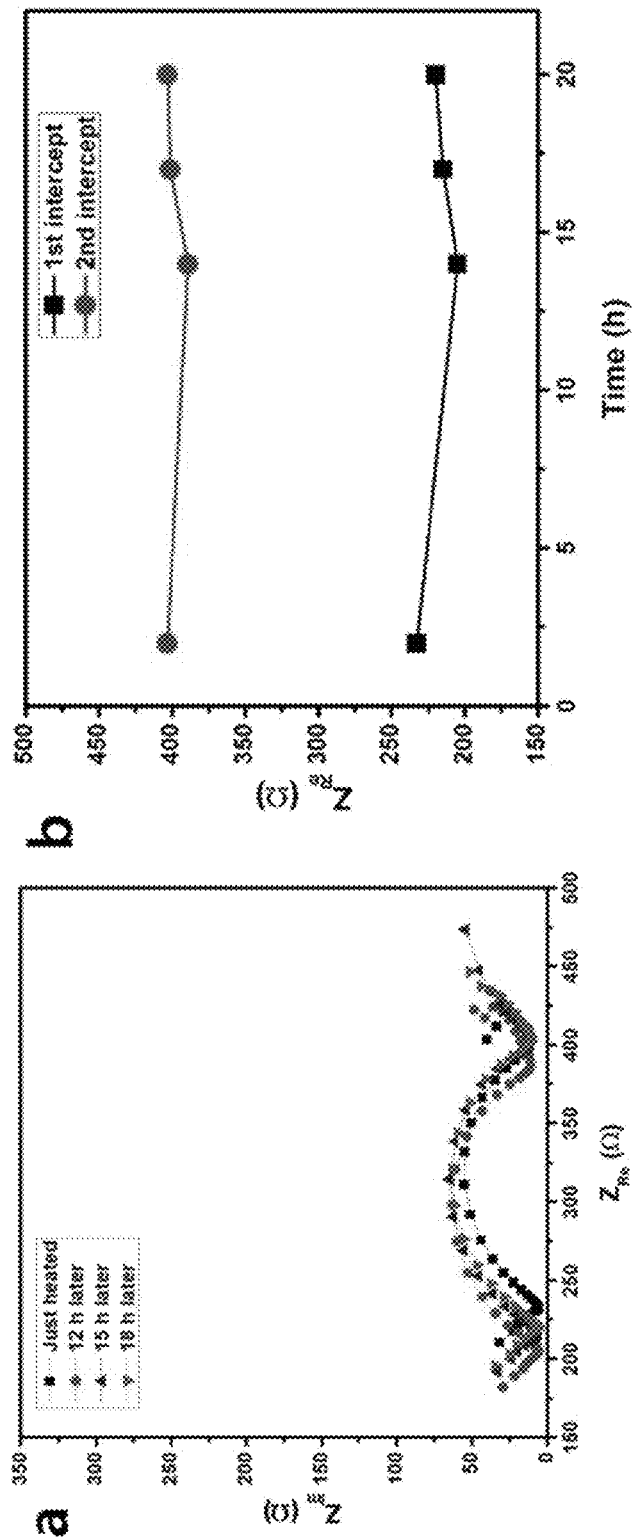
FIG. 6 illustrates an EIS curve of free-standing in-situ polymer-inorganic solid electrolyte layers at different temperatures and a corresponding intercept position changes, in accordance with one embodiment of the present disclosure.

FIG. 6 illustrates an EIS curve of free-standing in-situ polymer-inorganic solid electrolyte layers at different temperatures and a corresponding intercept position changes, in accordance with one embodiment of the present disclosure. As illustrated EIS curves follow the same shape as the stainless steel/SE/stainless steel symmetric cell cools off from about 120 degrees C. As illustrated, the impedance intercept changes, such that as the cell cools, the impedance intercept increases.

Figure 7:
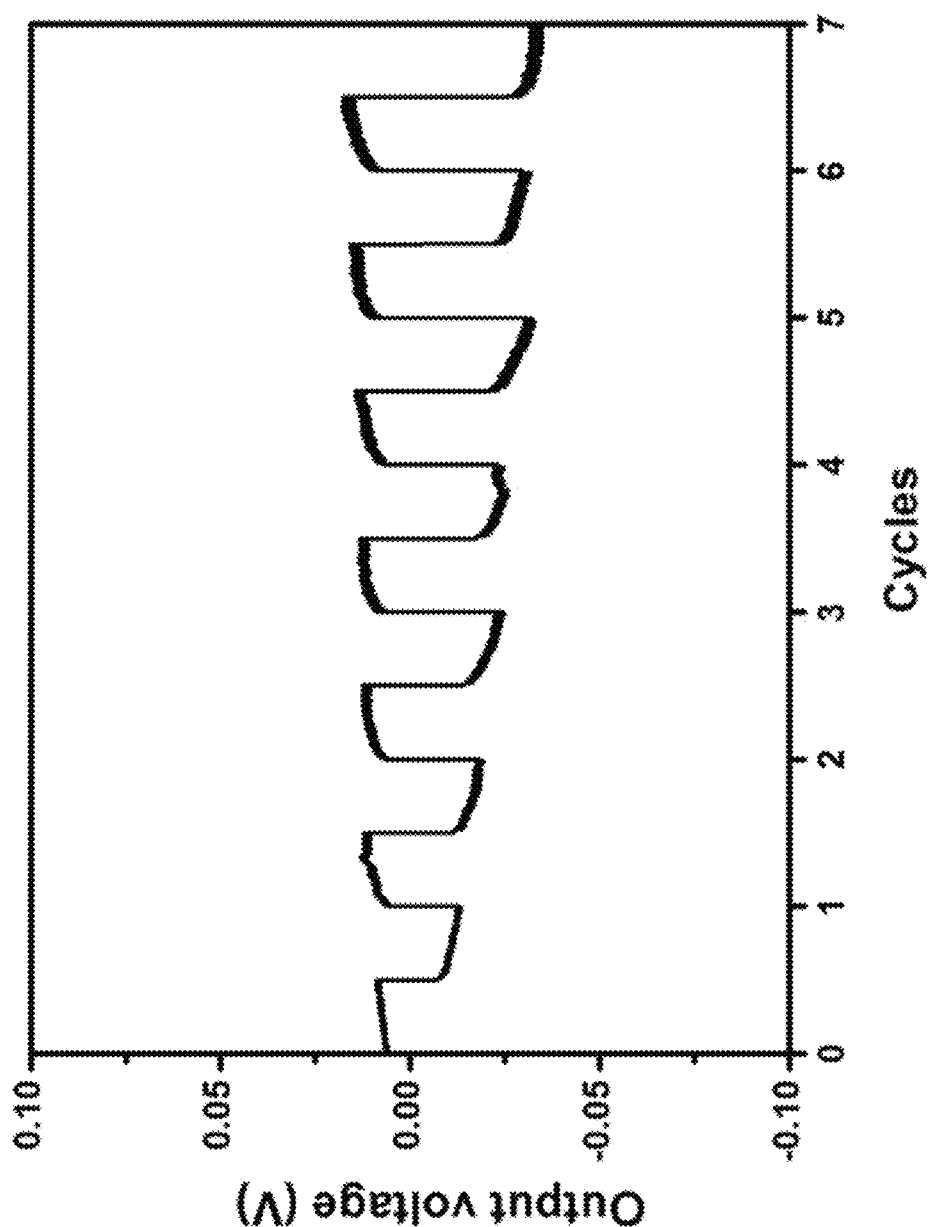
FIG. 7 illustrates symmetric cell cycling, in accordance with one embodiment of the present disclosure.

FIG. 7 illustrates symmetric cell cycling, in accordance with one embodiment of the present disclosure. As illustrated, the output voltage slowly expand the maximum and minimum voltage under high temperature (e.g., 120 degrees C.) cycling at a current density of about 0.01 mA/cm² with a 30 minute charge and discharge cycle.

Figure 8:
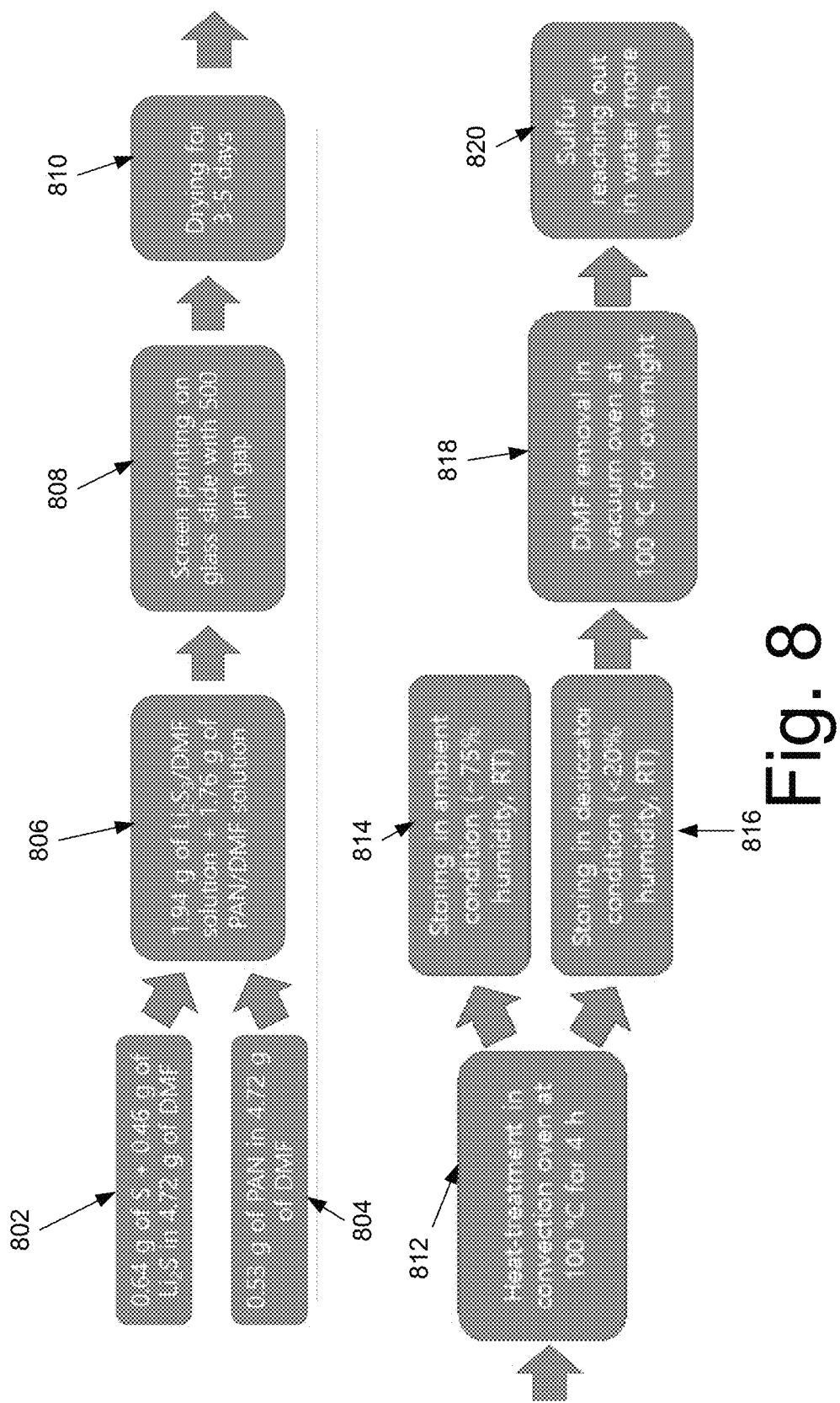
FIG. 8 illustrates a preparation process for a $Li_2S_3$–PAN film, in accordance with one embodiment of the present disclosure.

As illustrated in FIG. 8, at 802, S and Li$_2$S may be combined in DMF. In some embodiments, the amount of S used may range from about 0.01 g to about 2.00 g (as illustrated the amount may be about 0.64 g), the amount of Li$_2$S used may range from about 0.01 g to about 2.00 g (as illustrated the amount may be about 0.46 g), and the amount of DMF used may range from about 2.00 g to about 7.00 g (as illustrated the amount may be about 4.72 g).

At 804, PAN may be added to DMF. In embodiments, the amount of PAN used may range from 0.01 g to about 2.00 g (as illustrated the amount may be about 0.53 g), and the amount of DMF used may range from about 2.00 g to about 7.00 g (as illustrated the amount may be about 4.72 g).

At 806, the Li$_2$S$_3$/DMF and the PAN/DMF may be combined. In some embodiments, the amount of Li$_2$S$_3$/DMF used may range from about 1.00 g to about 5.00 g (as illustrated the amount may be about 1.94 g), and the PAN/DMF may range from about 1.00 g to about 5.00 g (as illustrated the amount may be about 1.76 g).

At 808, the solution may be screen printed on a glass slide where individual films may be separated from about 300 microns to about 800 microns (as illustrated, the distance may be about 500 microns). At 810, the glass slide with the screen printed solution may be dried for about 3 to about 5 days. 802-810 may be prepared within a glove box.

At 812, the glass slide may be heat treated in an oven. The oven may be heated from about 80 degrees C. to about 120 degrees C. (as illustrated, the temperature may be about 100 degrees C.). At 814, the glass slide may be stored in ambient conditions at room temperature. In some embodiments, as in 816, the glass slide may be stored in a desiccator where humidity is less than about 20% at room temperature.

At 818, DMF may be removed using a vacuum oven. The vacuum oven may be about 80 degrees C. to about 120 degrees C. (as illustrated, the temperature may be about 100 degrees C.). The glass slide may be left in the vacuum oven for about 12 hours. At 820, the S may reach out in water for more than 2 hours.

Figure 9:
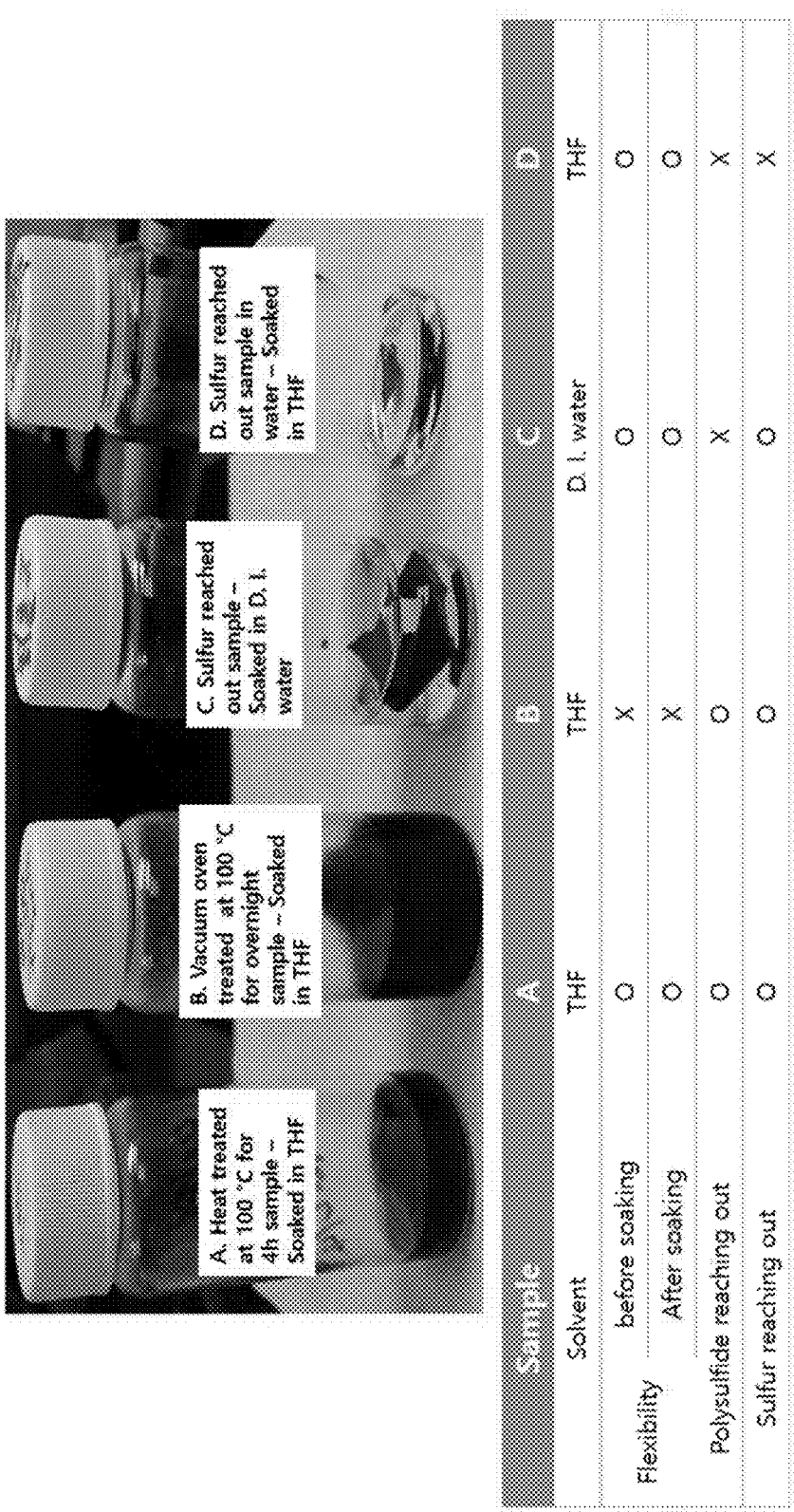
FIG. 9 illustrates different tests conducted on a $Li_2S_3$–PAN film, in accordance with one embodiment of the present disclosure.

FIG. 9 illustrates the chemical stability of a film soaked at various stages of testing, in accordance with one embodiment of the present disclosure. As illustrated, after 812, the film was soaked in THF and the flexibility was retained, the polysulfide was reaching out, and the S was reaching out.

As illustrated, after 818, the film was soaked in THF and the flexibility did not remain, but the polysulfide reached out, and the S reached out.

As illustrated, after 820, a S sample that reached out was soaked in deionized water and another sample was soaked in THF. The sample soaked in deionized water remained flexible, the polysulfide did not reach out, and the S still reached out. The sample soaked in THF remained flexible, but neither the polysulfide nor the S reached out.

Figure 10:
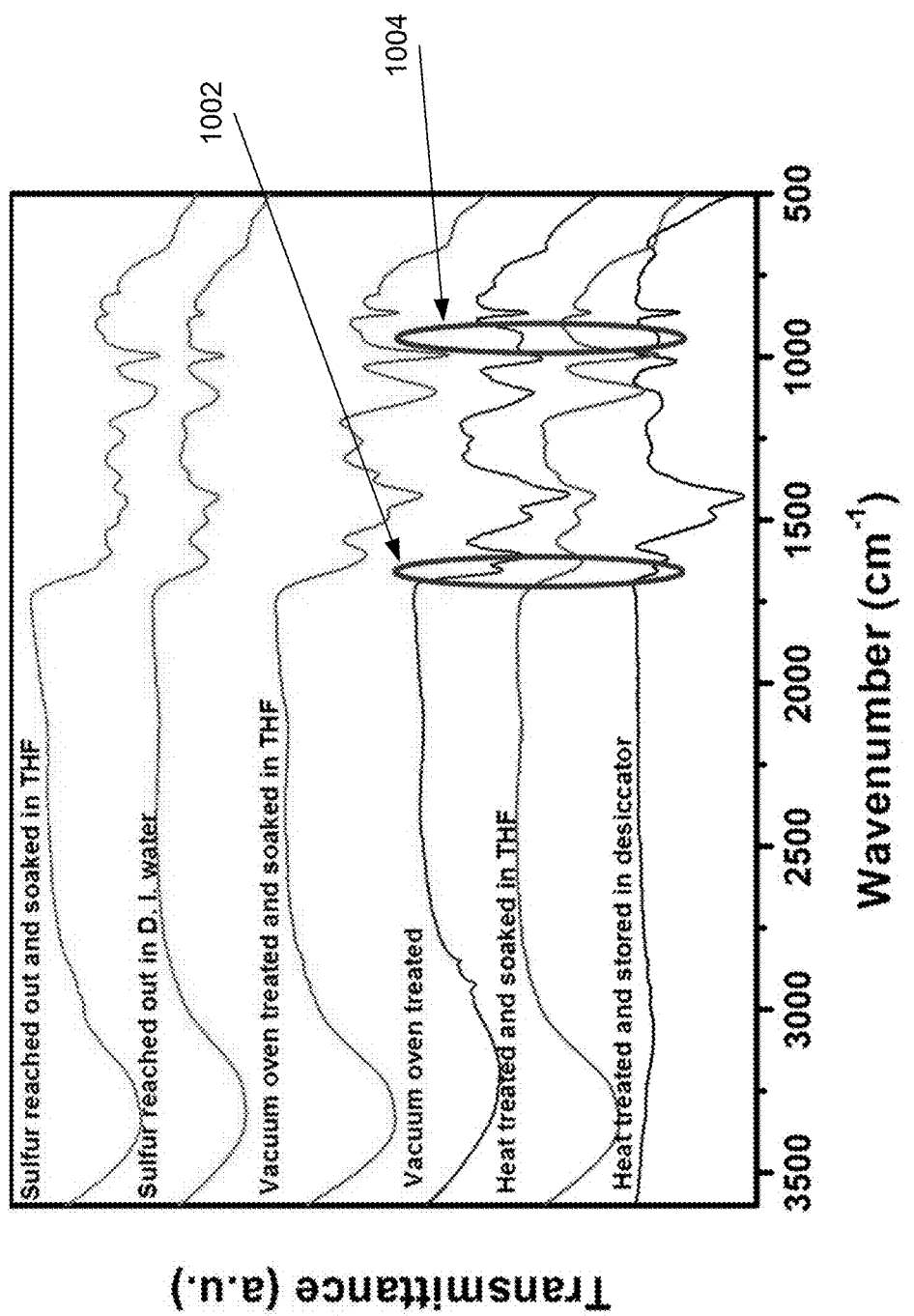
FIG. 10 illustrates a Fourier transform infrared spectroscopy test of differently treated $Li_2S_3$–PAN film, in accordance with one embodiment of the present disclosure.

FIG. 10 illustrates a Fourier transform infrared spectroscopy (FT-IR) test of differently treated Li$_2$S$_3$–PAN film, in accordance with one embodiment of the present disclosure. As illustrated, there are multiple tests taken through the process described in FIGS. 8 and 9. The peaks within the red circles 1002 and 1004 disappeared after a solvent treatment, indicating the S was reached out.

FIG. 11 illustrates different bonds formed at different wavenumbers, in accordance with one embodiment of the present disclosure. As illustrated different wavelengths may represent different bonds. As illustrated, the 1420 cm$^{-1}$ and the 1490 cm$^{-1}$ may represent a C=N bond, as well as the CH$_2$ and aromatic C=C, respectively.

Figure 12:
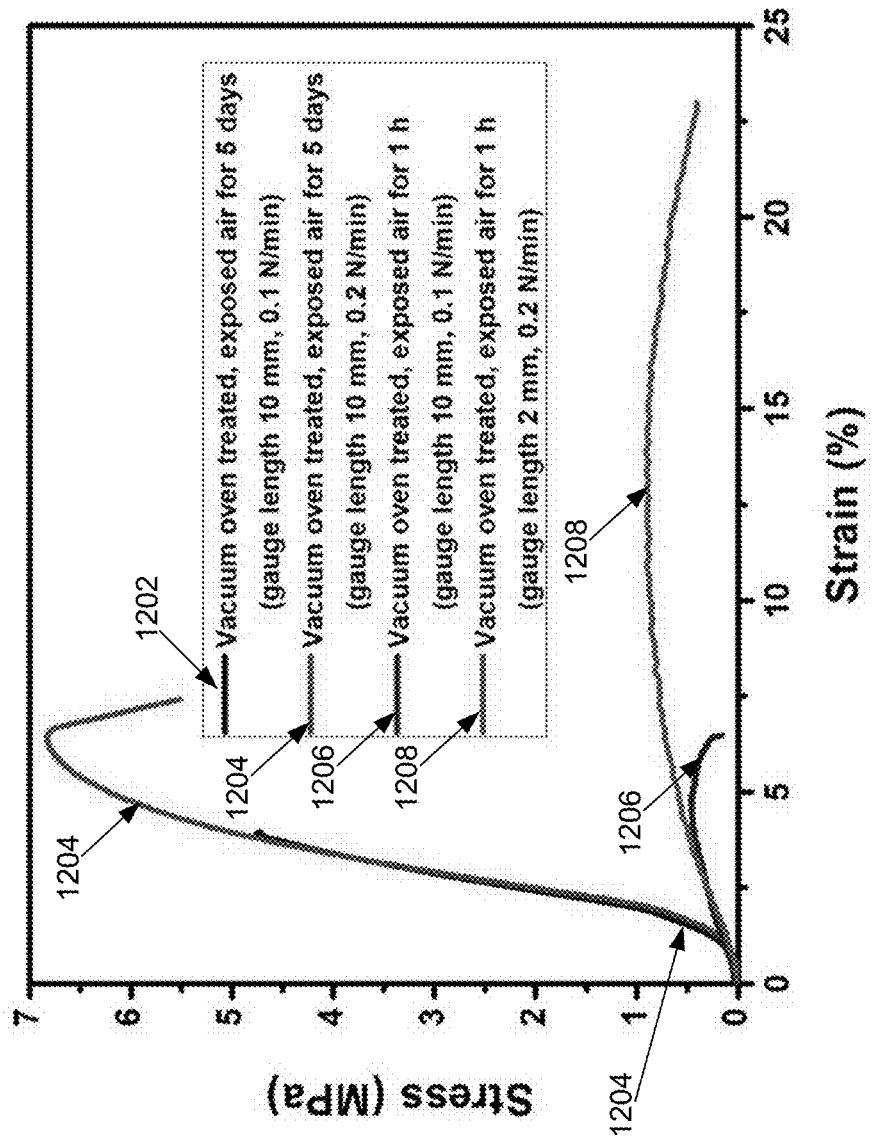
FIG. 12 illustrates a stress strain curve of $Li_2S_3$–PAN film subject to different environments, in accordance with one embodiment of the present disclosure.

FIG. 12 illustrates a stress strain curve of Li$_2$S$_3$–PAN film subject to different environments, in accordance with one embodiment of the present disclosure. In the tests, the film stiffened over time as it was exposed, but no breaking was found. As illustrated, stress strain curve 1204 reached the highest ultimate tensile stress. Stress strain curve 1202 follows stress strain curve 1204 substantially and ends before reaching 5 MPa. Stress strain curve 1206 does not reach very high stress values, similar to stress strain curve 1208. The stress strain curves 1202, 1204, 1206, and 1208 also reveal properties of the individual films.

FIG. 13 illustrates stresses and strains of samples subject to different environments, in accordance with one embodiment of the present disclosure. These values correspond to the test in FIG. 12. As illustrated, the 0.2 N/min sample film exposed to air for 5 days underwent a modulus of about 226.1 MPa, a ultimate tensile stress of about 6.80 MPa, and reached a maximum strain of about 7.40%. The 2 mm gauge sample film exposed to air for 1 hour underwent a modulus of about 13.5 MPa, a ultimate tensile stress of about 0.90 MPa, and reached a maximum strain of about 22.99%.

Figure 14:
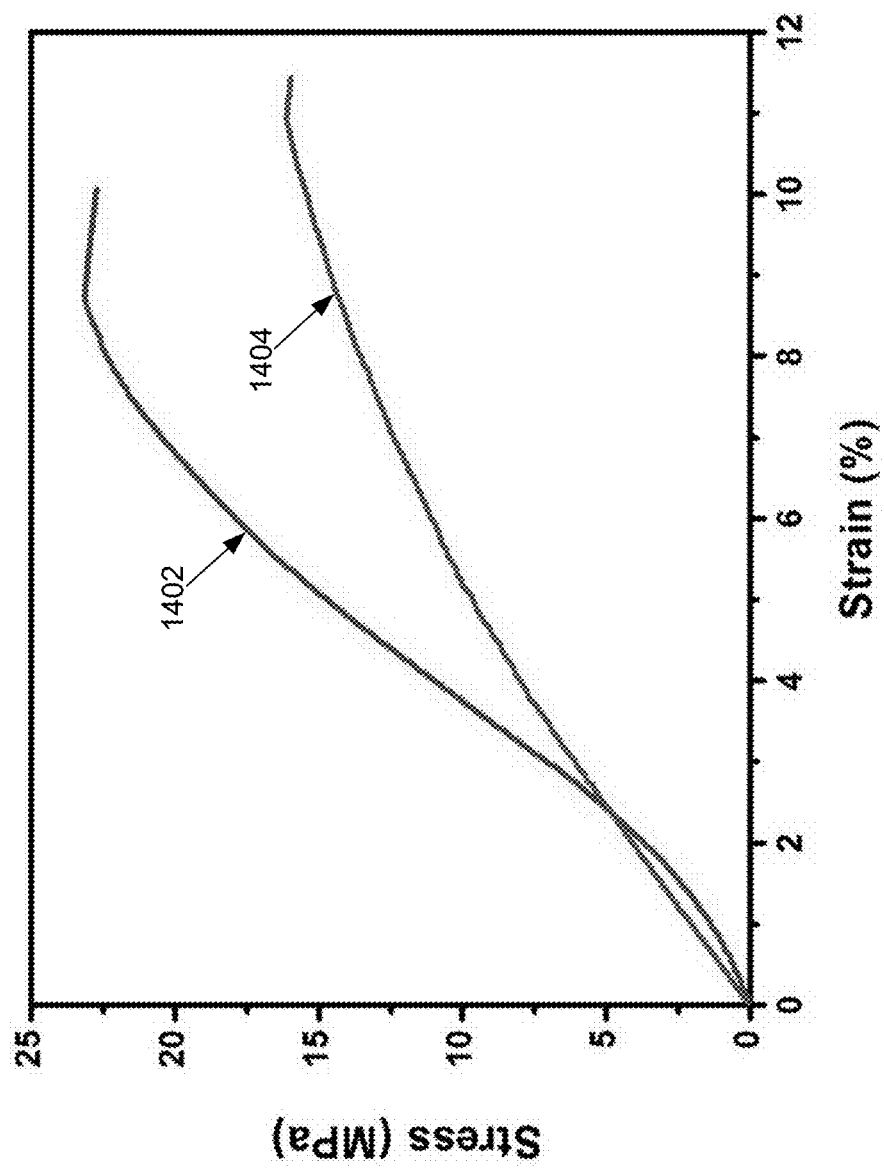
FIG. 14 illustrates a stress strain curve of $Li_2S_3$–PAN film subject to different environments, in accordance with one embodiment of the present disclosure.

FIG. 14 illustrates a stress strain curve of Li$_2$S$_3$–PAN film subject to different environments, in accordance with one embodiment of the present disclosure. The samples used in this test were about 4 mm wide, with about a 30 micron thickness. The gauge length was about 2 mm and the testing speed was about 0.2 N/min. Stress strain curve 1402 reached a higher ultimate tensile strength, but stress strain curve 1404 reached a greater strain rate. Curves 1402 and 1404 end at the point the sample films broke.

FIG. 15 illustrates stresses and strains of samples subject to different environments, in accordance with one embodiment of the present disclosure. These values correspond to the test in FIG. 14. Samples #1 and #3 are not depicted in FIG. 14. Sample #2 corresponds to stress strain curve 1402 and sample #4 corresponds to stress strain curve 1404. As illustrated, sample #2 underwent a modulus of about 356.2 MPa, a ultimate tensile stress of about 23.146 MPa at about 8.72% strain, and reached a breaking strain of about 10.06%. Sample #4 underwent a modulus of about 204.7 MPa, a ultimate tensile stress of about 16.129 MPa at about 10.93% strain, and reached a breaking strain of about 11.44%.

Figure 16:
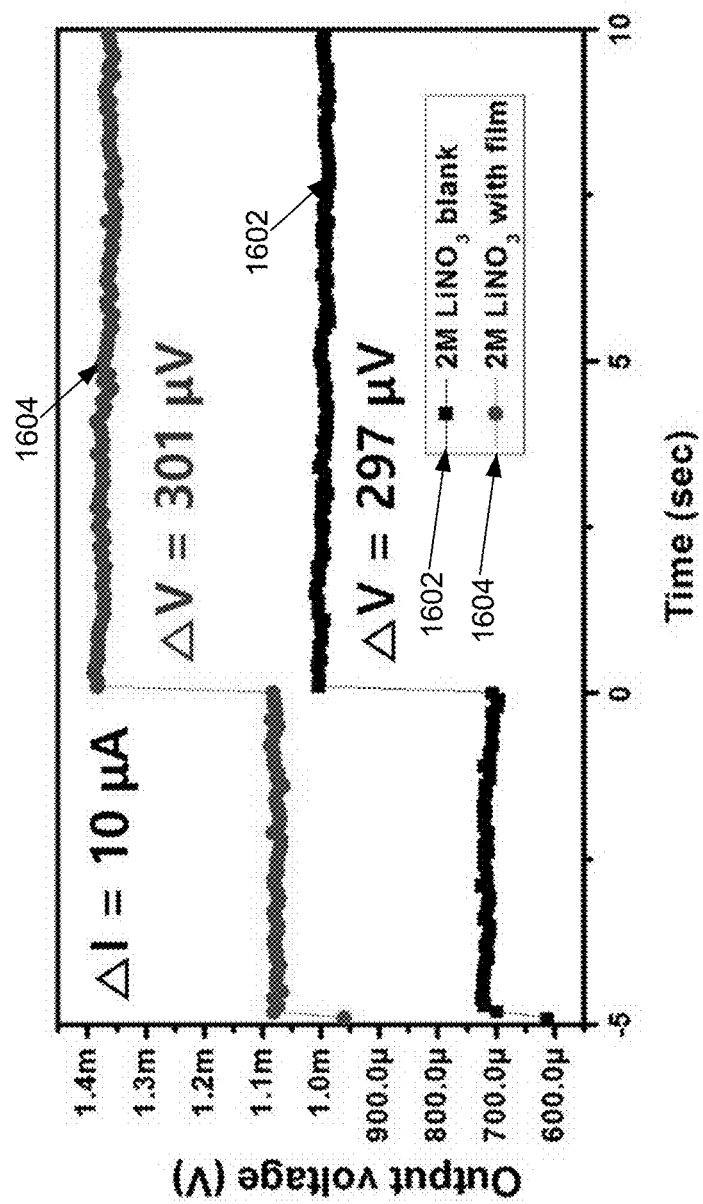
FIG. 16 illustrates the results of performing chronopotentiometry using a 4-point probe on samples with 2 moles of $LiNO_3$, in accordance with one embodiment of the present disclosure.

FIG. 16 illustrates the results of performing chronopotentiometry using a 4-point probe on samples with 2 moles of LiNO$_3$, in accordance with one embodiment of the present disclosure. The graph illustrates the change in output voltage as a function of time to test ionic conductivity for 2 moles of LiNO$_3$. The test used a sample of about 1.77 cm² with a thickness of about 30 microns. Pt strips were used as the working and counter electrode, and AgCL was used as the working and counter sense/reference electrode. The change in current is about 10 microamperes and the change in voltage for the 2 moles of LiNO$_3$ 1602 is about 301 microvolts. The change in voltage for the 2 moles of LiNO$_3$ with the film 1604 is about 297 microvolts. The Li-ion conductivity was about 4.24×10$^{-3}$S/cm.

Figure 17:
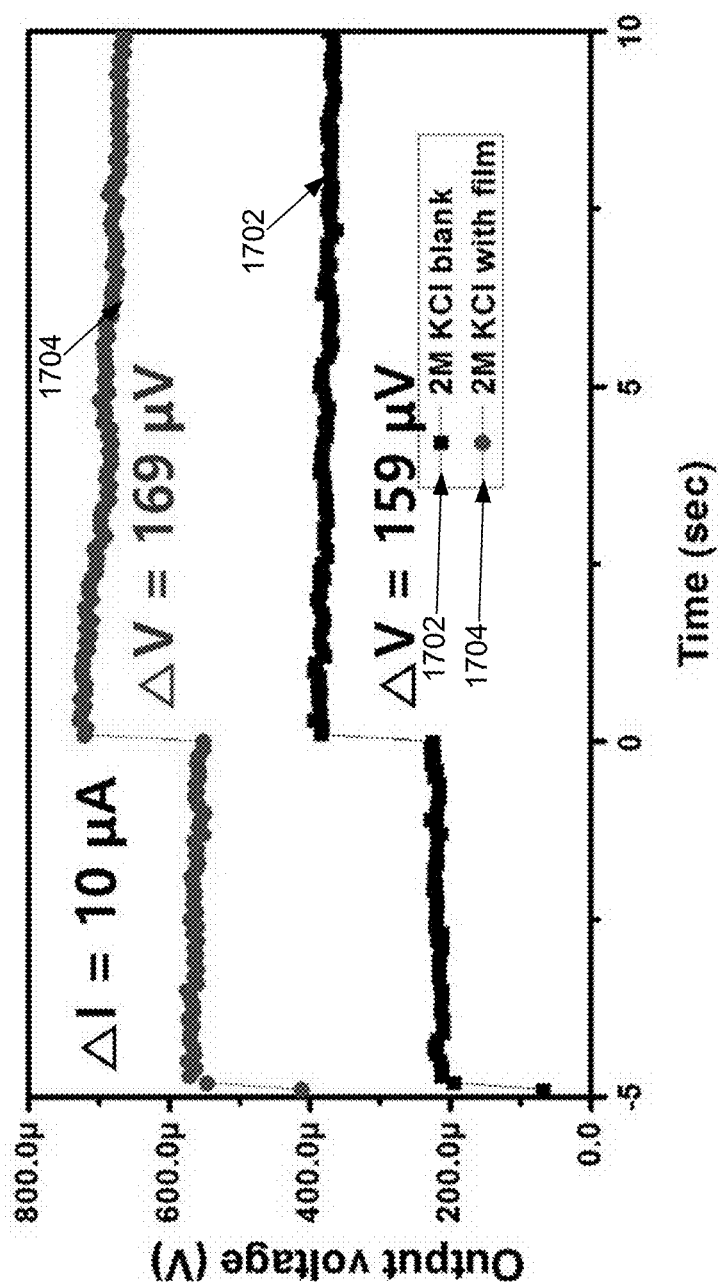
FIG. 17 illustrates the results of performing chronopotentiometry using a 4-point probe on samples using 2 moles of KCl, in accordance with one embodiment of the present disclosure.

FIG. 17 illustrates the results of performing chronopotentiometry using a 4-point probe on samples using 2 moles of KCl, in accordance with one embodiment of the present disclosure. The graph illustrates the change in output voltage as a function of time to test ionic conductivity for 2 moles of KCl. The test used a sample of about 1.77 cm$^2$ with a thickness of about 30 microns. Pt strips were used as the working and counter electrode, and AgCL was used as the working and counter sense/reference electrode. The change in current is about 10 microamperes and the change in voltage for the 2 moles of KCl 1702 is about 169 microvolts. The change in voltage for the 2 moles of KCl with the film 1704 is about 159 microvolts. The K-ion conductivity was about $1.69 \times 10^{-3}$ S/cm.

Figure 18:
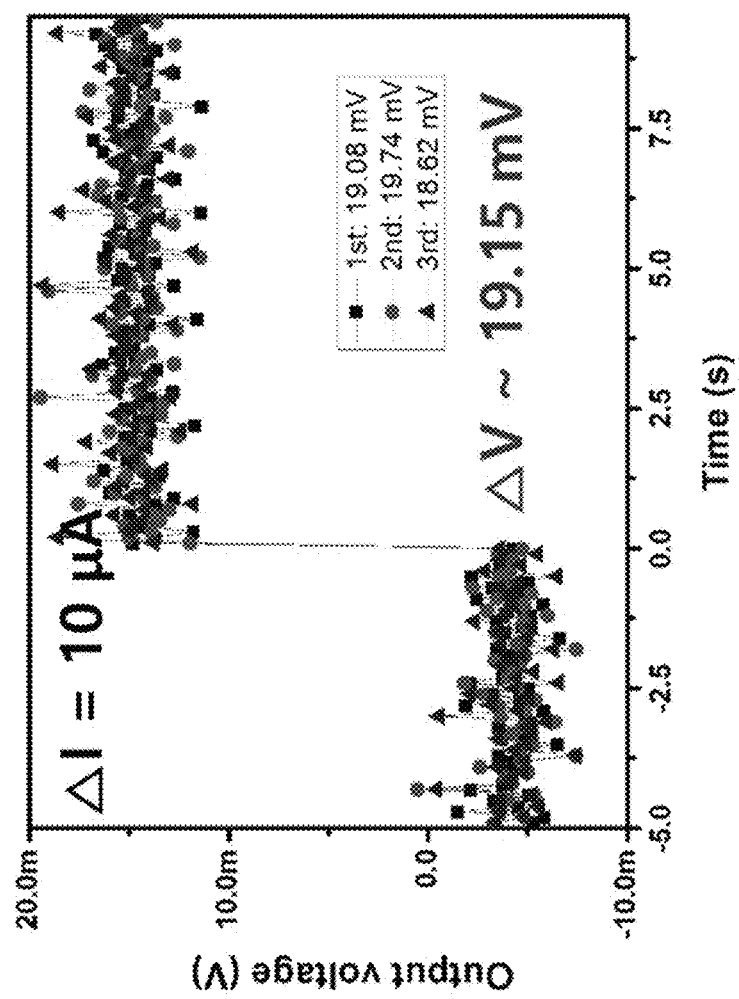
FIG. 18 illustrates the results of performing chronopotentiometry using a 4-point probe on samples using 1 mole of $LiPF_6$, in accordance with one embodiment of the present disclosure.
Figure 19:
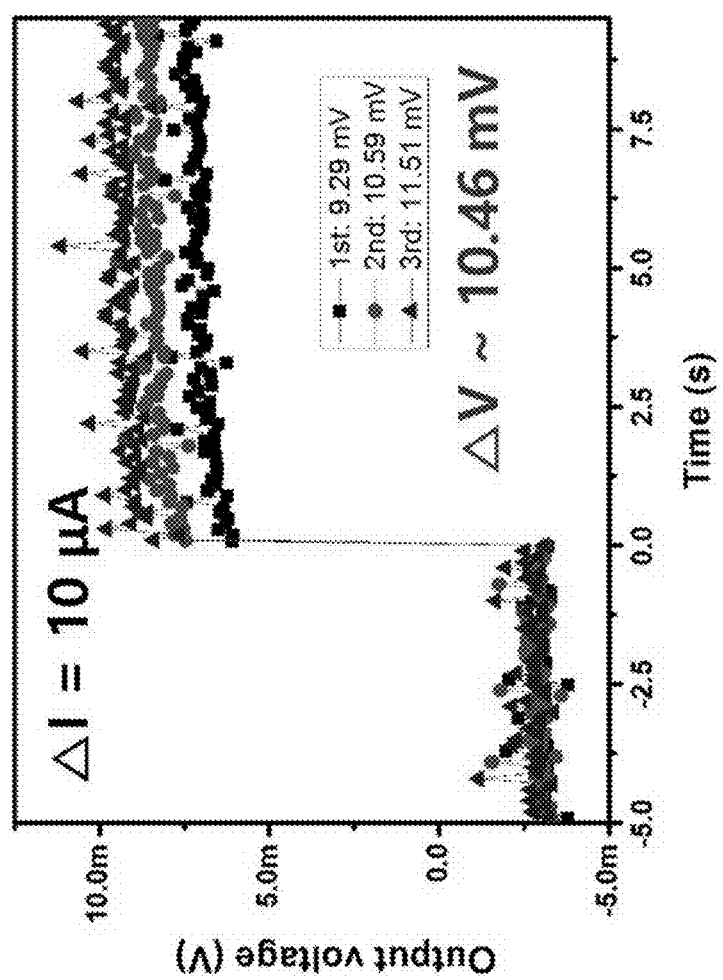
FIG. 19 illustrates the results of performing chronopotentiometry using a 4-point probe on film, in accordance with one embodiment of the present disclosure.

FIGS. 18 and 19 illustrate the results of performing chronopotentiometry using a 4-point probe on samples using 1 mole of LiPF$_6$, in accordance with one embodiment of the present disclosure. Referring to FIG. 18, the graph illustrates the change in output voltage as a function of time to test ionic conductivity for 1 mole of LiPF$_6$ in EC/DMC. The test used a sample of about 1.77 cm$^2$ with a thickness of about 30 microns. Li was used as the working and counter electrode and as the working and counter sense/reference electrode. The change in current is about 10 microamperes and the change in voltage for the 1 mole of LiPF$_6$ 1702 is about 10.46 millivolts. Referring to FIG. 19, the sample with the film had a change in voltage of about 19.15 millivolts. The Li-ion conductivity was about $1.95 \times 10^{-6}$ S/cm.

Figure 20:
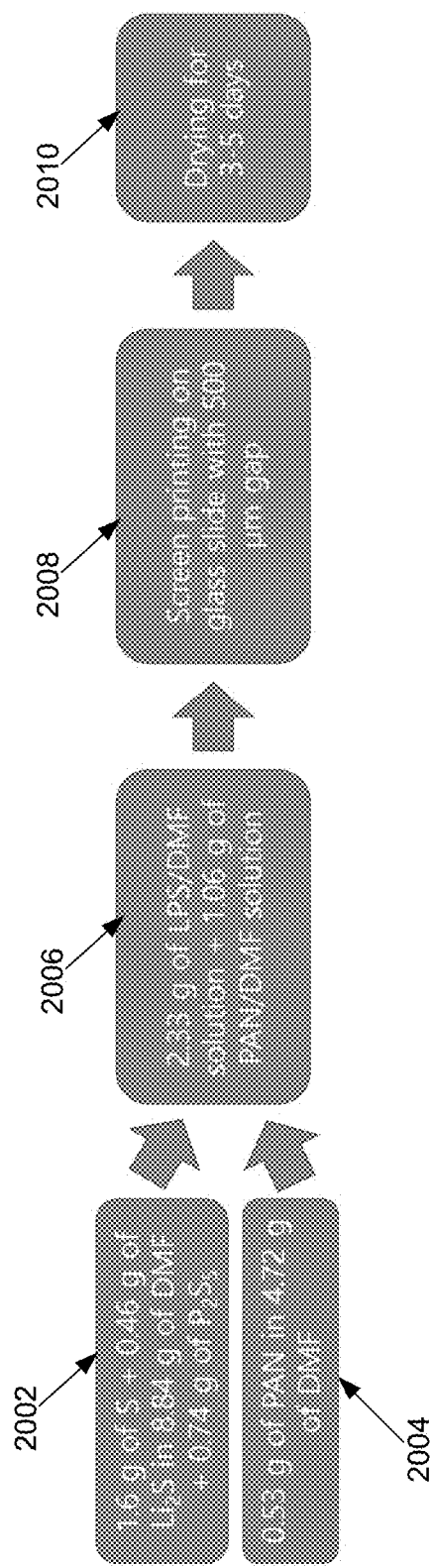
FIG. 20 illustrates a preparation process for a $3Li_2S_6$–$P_2S_5$–PAN film, in accordance with one embodiment of the present disclosure.

FIG. 20 illustrates a preparation process for a 3Li$_2$S$_6$–P$_2$S$_5$–PAN film, in accordance with one embodiment of the present disclosure. As illustrated, at 2002, S and Li$_2$S may be combined in DMF and P$_2$S$_5$ (which may be referred to as Li thiophosphate (LPS)/DMF). In some embodiments, the amount of S used may range from about 1.00 g to about 4.00 g (as illustrated the amount may be about 1.60 g), the amount of Li$_2$S used may range from about 0.01 g to about 2.00 g (as illustrated the amount may be about 0.46 g), the amount of DMF used may range from about 6.00 g to about 10.00 g (as illustrated the amount may be about 8.84 g), and the amount of P$_2$S$_5$ may range from about 0.01 g to about 2.00 g (as illustrated the amount may be about 0.74 g).

At 2004, PAN may be added to DMF. In embodiments, the amount of PAN used may range from 0.01 g to about 2.00 g (as illustrated the amount may be about 0.53 g), and the amount of DMF used may range from about 2.00 g to about 7.00 g (as illustrated the amount may be about 4.72 g).

At 2006, the LPS/DMF and the PAN/DMF may be combined. In some embodiments, the amount of LPS/DMF used may range from about 1.00 g to about 5.00 g (as illustrated the amount may be about 2.33 g), and the PAN/DMF may range from about 1.00 g to about 5.00 g (as illustrated the amount may be about 1.06 g).

At 2008, the solution may be screen printed on a glass slide where individual films may be separated from about 300 microns to about 800 microns (as illustrated, the distance may be about 500 microns). At 2010, the glass slide with the screen printed solution may be dried for about 3 to about 5 days.

Figure 21:
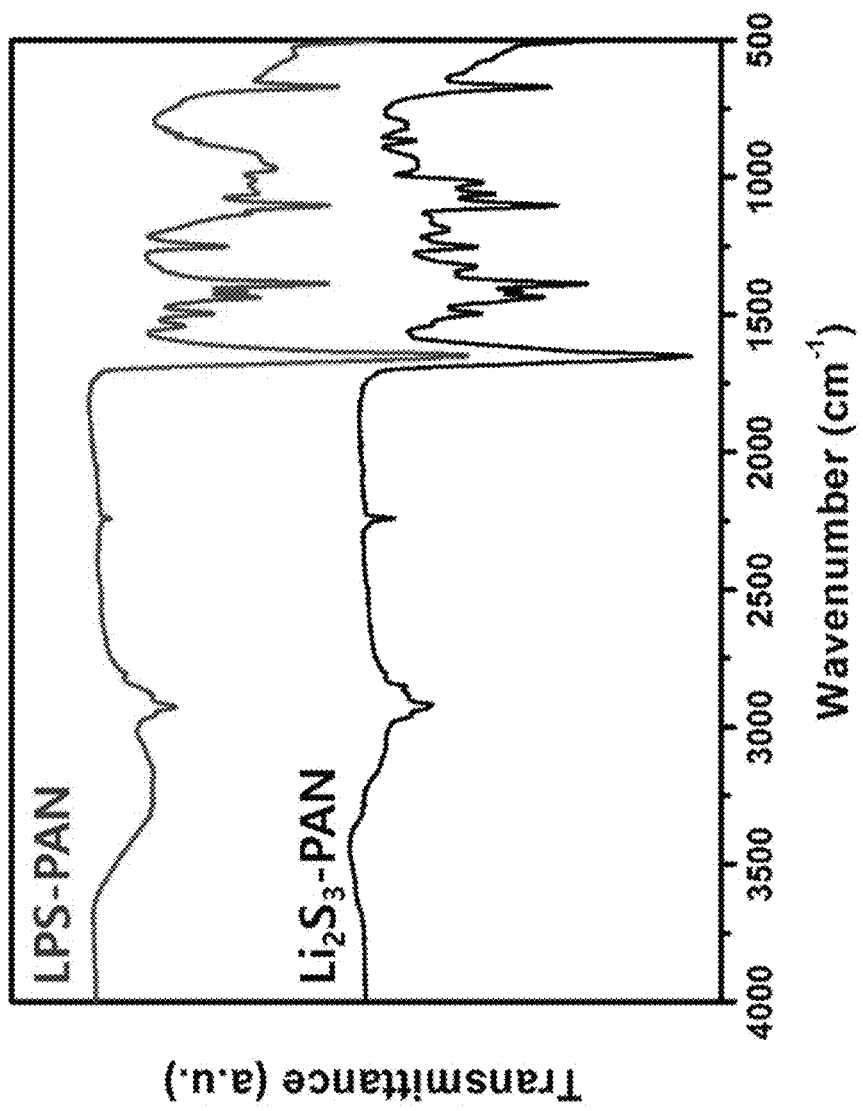
FIG. 21 illustrates a Fourier transform infrared spectroscopy test of different films, in accordance with one embodiment of the present disclosure.

FIG. 21 illustrates a Fourier transform infrared spectroscopy test of different films, in accordance with one embodiment of the present disclosure. The sample film corresponds to one prepared using the process of FIG. 20. As illustrated, C—H bond related peaks (e.g., 1325 cm$^{-1}$ and 864 cm$^{-1}$) and C—O bond related peaks (e.g., 1191 cm$^{-1}$ and 1015 cm$^{-1}$) were significantly reduced, while the C—N or amide II bond related peak (1540 cm$^{-1}$) and the C—S or P—O bond related peak (967 cm$^{-1}$) were increased compared to the film prepared through the process of FIG. 8, indicating the 3Li$_2$S$_6$–P$_2$S$_5$–PAN film is more cross-linked and dehydrogenated.

Figure 22:
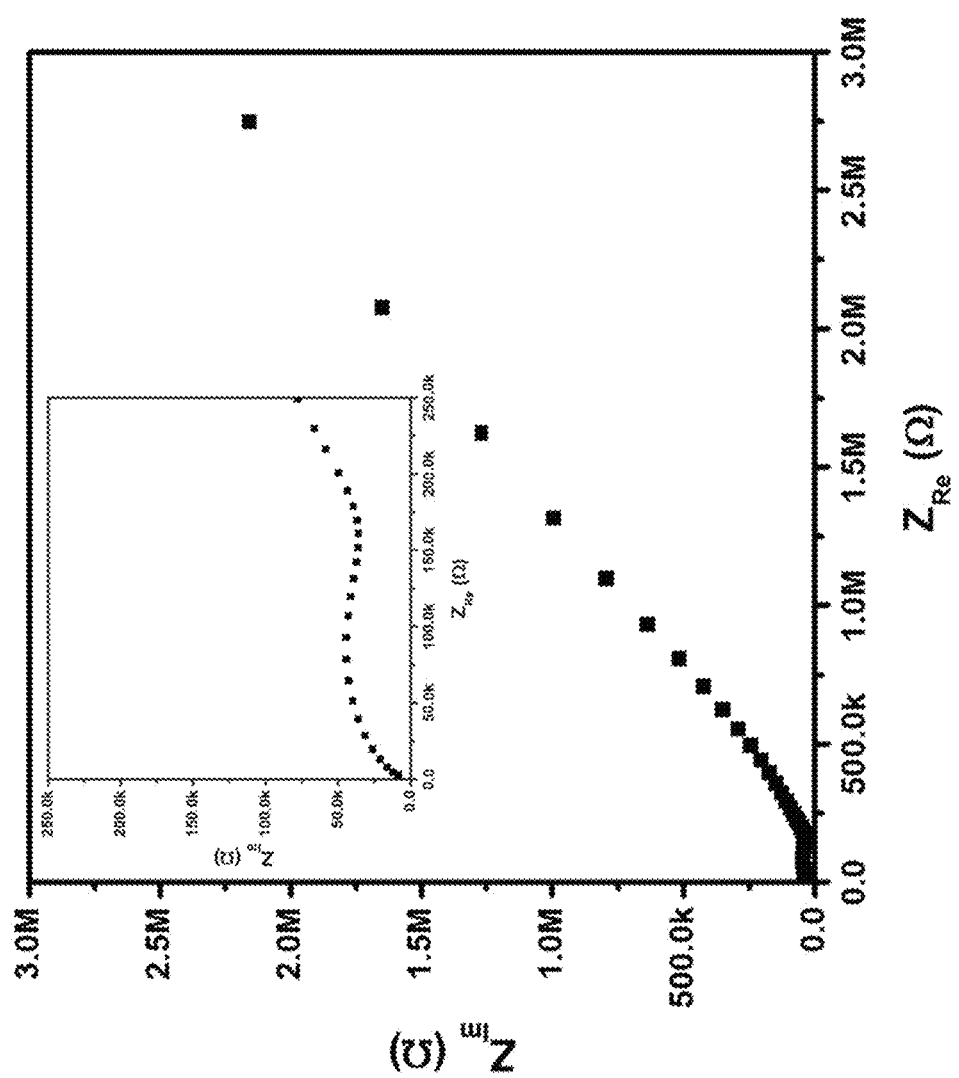
FIG. 22 illustrates impedance data of S films, in accordance with one embodiment of the present disclosure.
Figure 23:
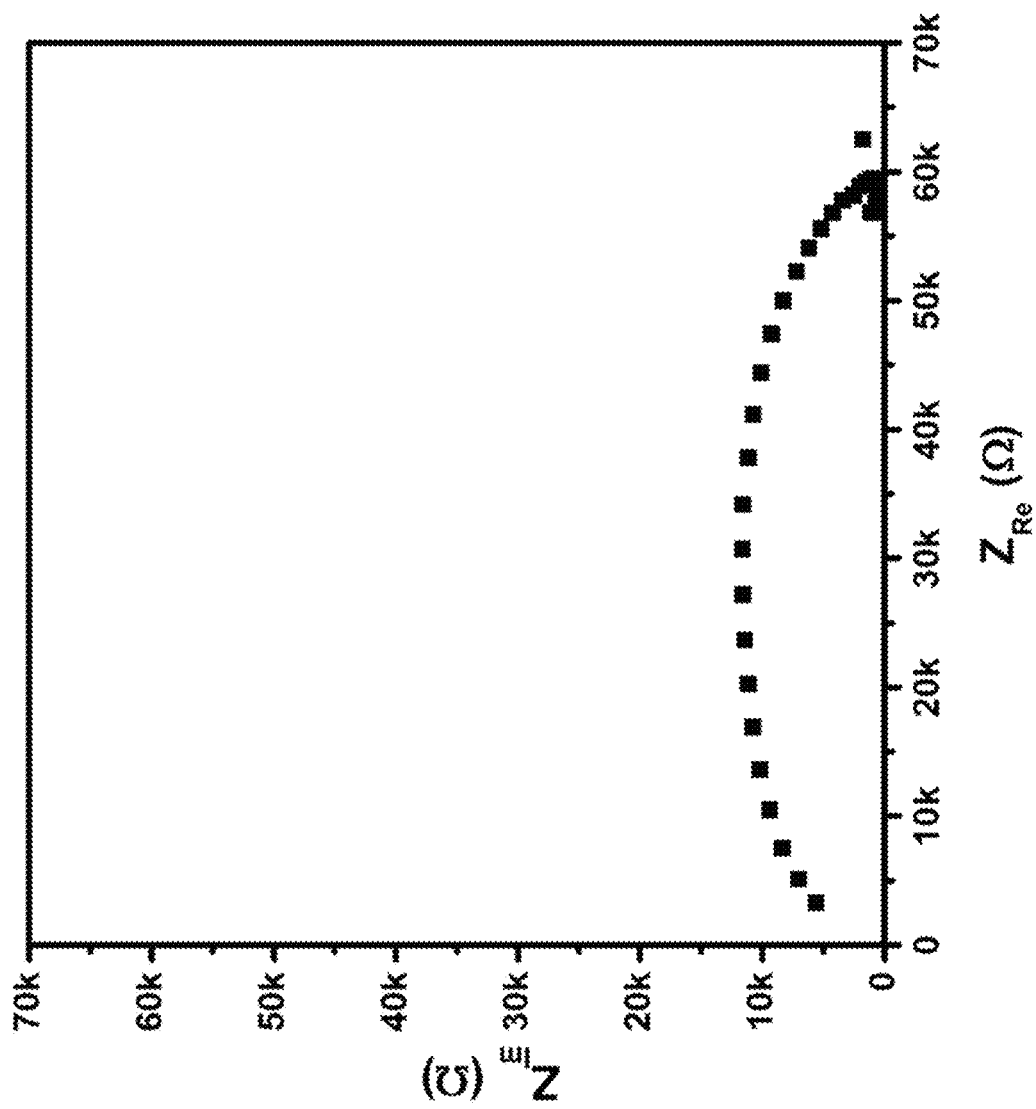
FIG. 23 illustrates impedance data of Li films, in accordance with one embodiment of the present disclosure.

FIG. 22 illustrates impedance data of S films, in accordance with one embodiment of the present disclosure. As illustrated, the graph depicts a depressed semicircle and Warburg behavior, where the intercept is at about 150 kiloohms. FIG. 23 illustrates impedance data of Li films, in accordance with one embodiment of the present disclosure. As illustrated, the graph depicts a depressed semicircle with about 60 kiloohms at the intercept.

Figure 24:
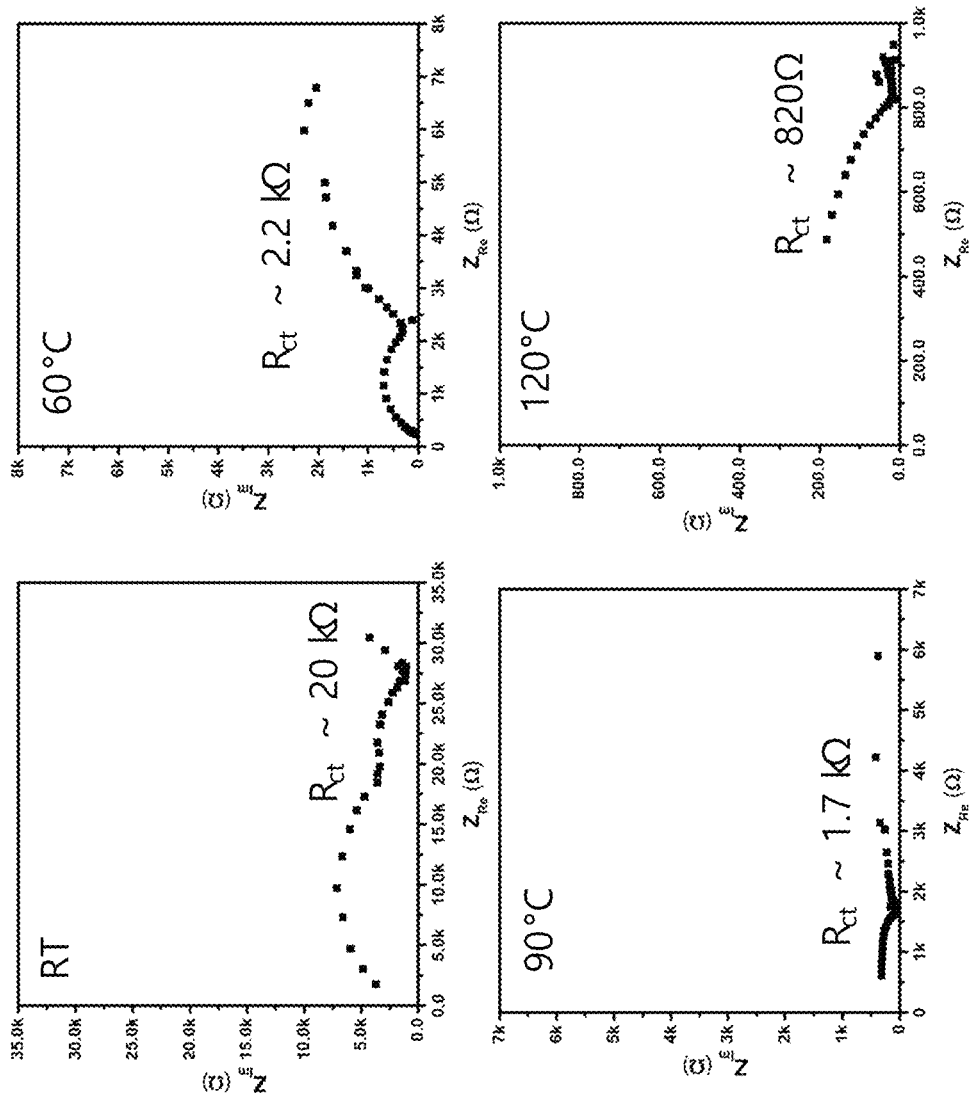
FIG. 24 illustrates impedance data of a film at different temperatures, in accordance with one embodiment of the present disclosure.

FIG. 24 illustrates impedance data of a film at different temperatures, in accordance with one embodiment of the present disclosure. As illustrated, the impedance range at room temperature reaches about 30.0 kiloohms, and slowly drops as the temperature increases. In particular, the relative minimums start at about 20 kiloohms and increases to about 820 ohms at 12 degrees C.

Figure 25:
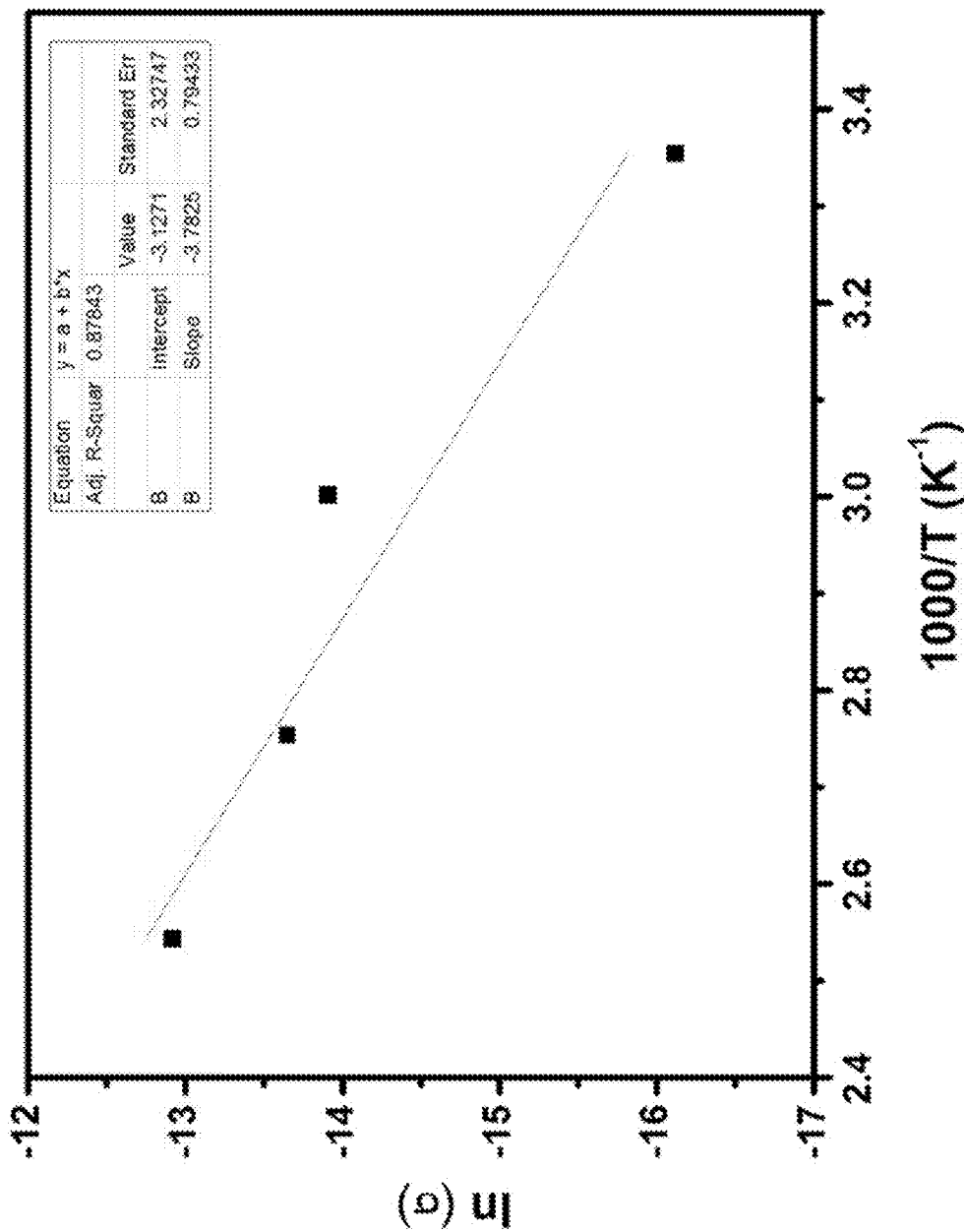
FIG. 25 illustrates an Arrhenius plot of the film, in accordance with one embodiment of the present disclosure.

FIG. 25 illustrates an Arrhenius plot of the film, in accordance with one embodiment of the present disclosure. As illustrated, the reaction rate constant as a function of temperature reveals that the activation energy for the 3Li$_2$S$_6$–P$_2$S$_5$–PAN film is about 31.45 kJ/mol.

Figure 26:
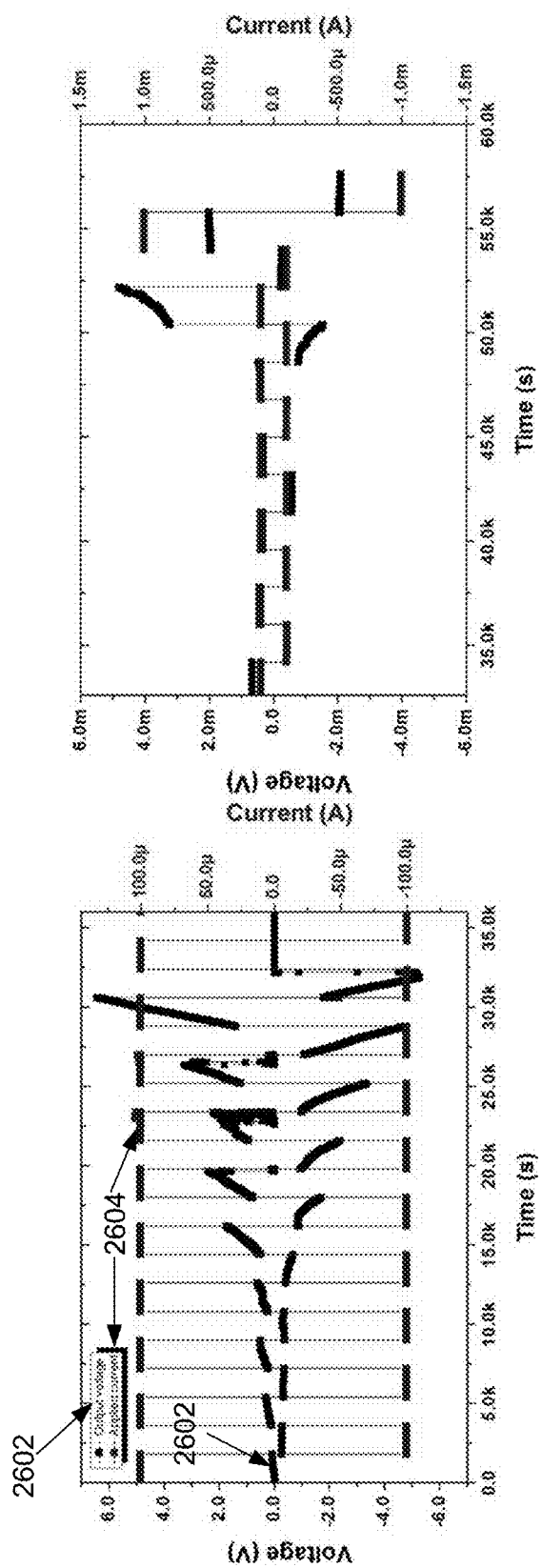
FIG. 26 illustrates film cycling at a given temperature, in accordance with one embodiment of the present disclosure.

FIG. 26 illustrates film cycling at a given temperature, in accordance with one embodiment of the present disclosure. As illustrated, the 3Li$_2$S$_6$–P$_2$S$_5$–PAN film was cyclable, but shorted after fifteen cycles. The charge discharge time was about 30 minutes and the current density was about 0.4 mA/cm$^2$ for the first fifteen cycles and about 4 mA/cm$^2$ for the sixteenth cycle.

Figure 27:
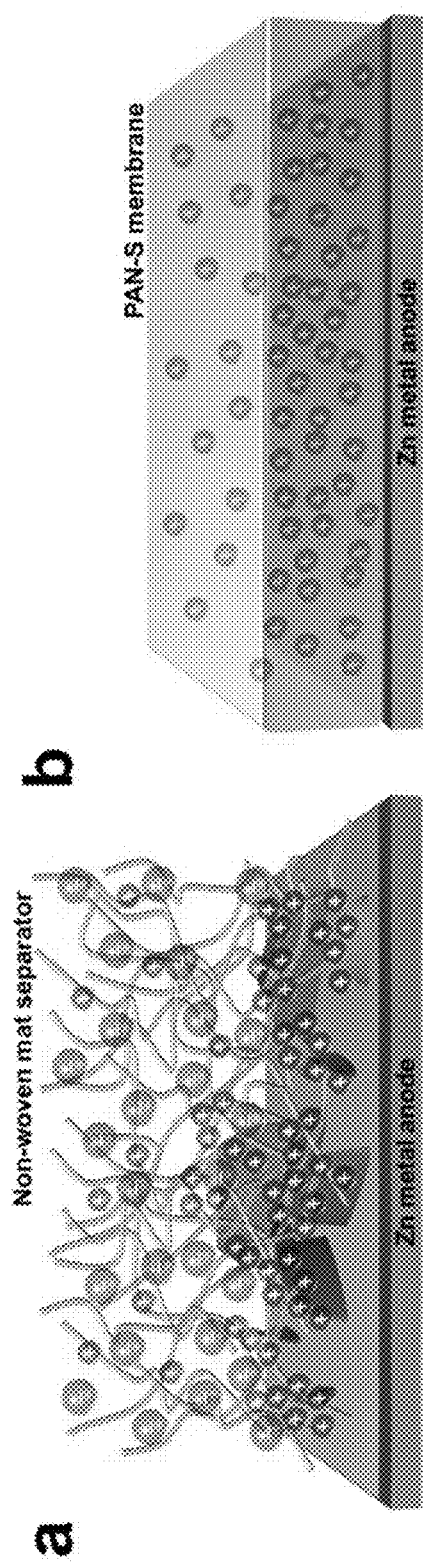
FIG. 27 illustrates advantages of a PAN-S membrane on a Zn metal anode, in accordance with one embodiment of the present disclosure.

FIG. 27 illustrates advantages of a PAN-S membrane on a Zn metal anode, in accordance with one embodiment of the present disclosure. As illustrated in a of FIG. 27, Zn dendritic growth occurs due to the ramified Zn deposition at the interface between the Zn and a separator. As illustrated in b, dendrite growth is suppressed due to uniform Zn$^{2+}$ concentration at the interface between Zn and single-ion transport membrane (e.g., PAN-S membrane).

Figure 28:
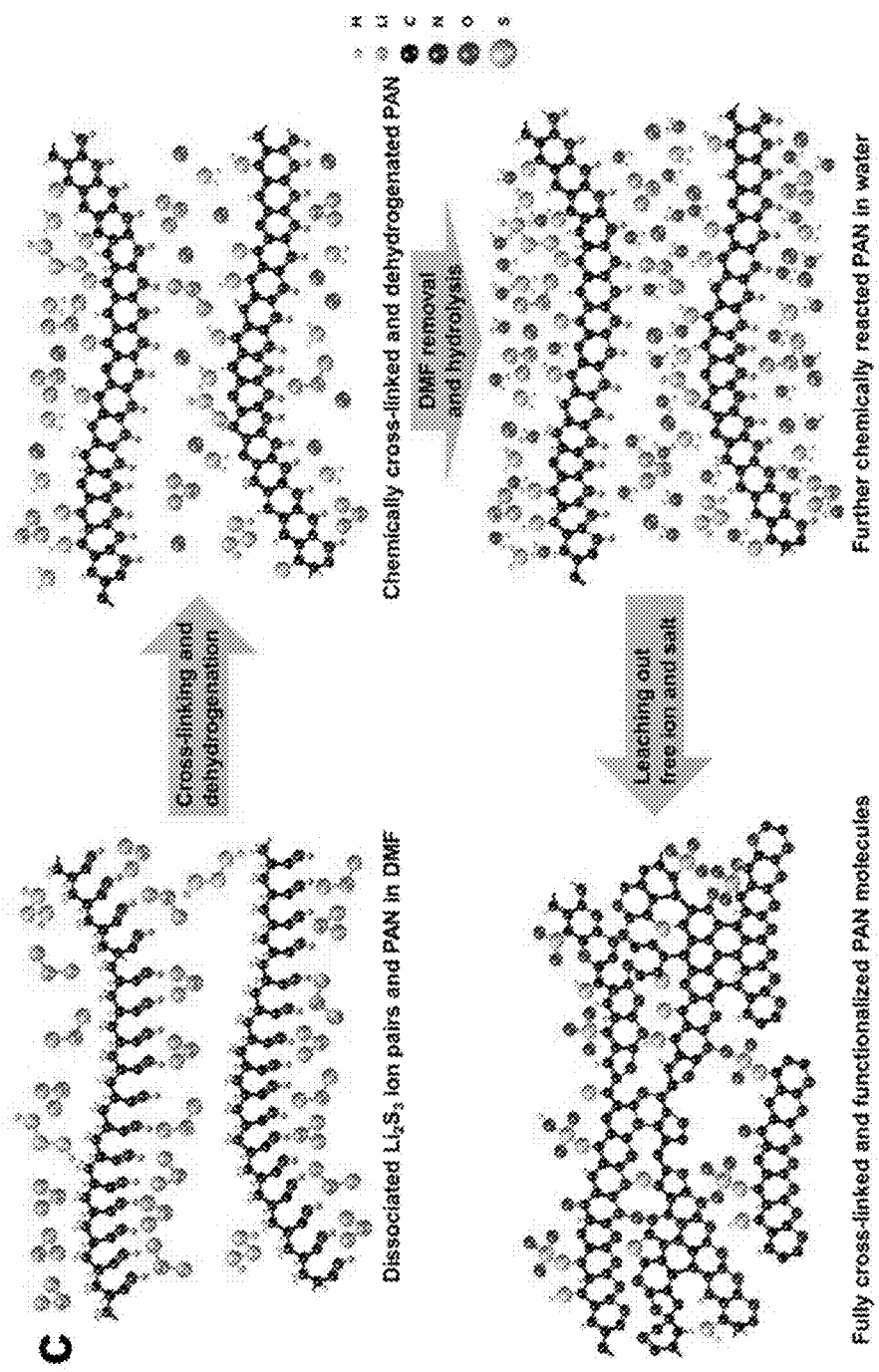
FIG. 28 illustrates a synthesis process for forming a PAN-S membrane, in accordance with one embodiment of the present disclosure.

FIG. 28 illustrates a synthesis process for forming a PAN-S membrane. As illustrated, dissociated Li$_2$S$_3$ ion pairs are combined with PAN in DMF. The PAN is chemically cross-linked and dehydrogenated. The DMF is removed and the components undergo hydrolysis as the chemically reacted PAN is submerged in water. Finally, the free ions and salt is leached out, resulting in fully cross-linked and functionalized PAN molecules.

Figure 29:
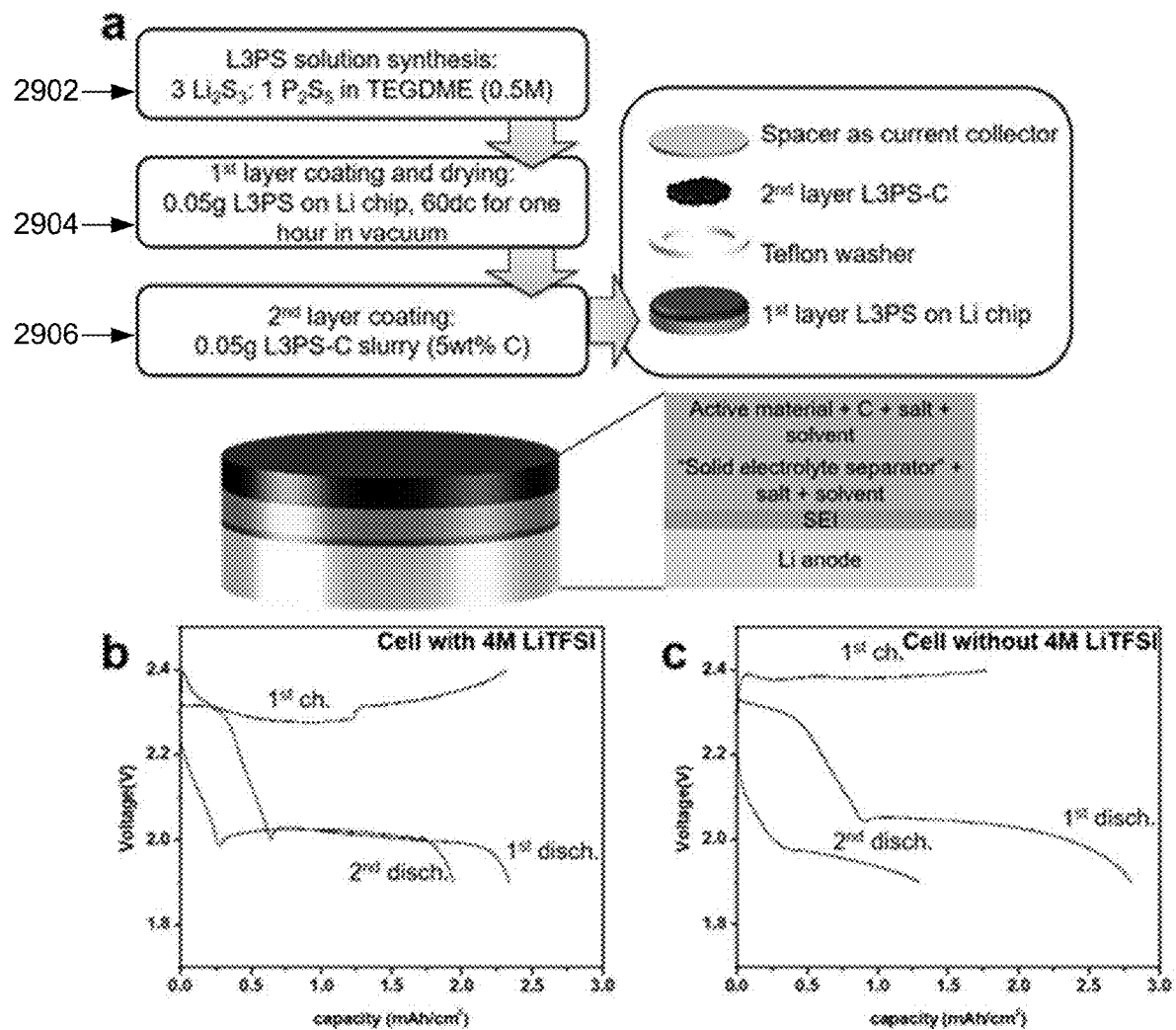
FIG. 29 illustrates an example process and configuration for a semi-solid cell and corresponding characteristics, in accordance with one embodiment of the present disclosure.

FIG. 29 illustrates an example process and configuration for a semi-solid cell and corresponding characteristics, in accordance with one embodiment of the present disclosure. As illustrated, in a of FIG. 29, 2902 has a L3PS solution including 3 Li$_2$S$_3$: 1 P$_2$S$_5$ in 0.5 M TEGDME. At 204, the first layer includes an amount of L3PS ranging from about 0.01 to about 1 gram applied to a Li anode and dried at 60 degrees C. for one hour in a vacuum.

At 2906, a layer of L3PS—C (5% wt C) slurry is applied as a second layer. The semi-solid cell is configured such that a Li anode is on a first side, and a solid electrolyte interphase (SEI) layer is disposed on top of the Li anode, a solid electrolyte separator with salt and solvent is disposed on top of the SEI layer, and an active material with C, salt, and the solvent disposed on top of the solid electrolyte separator layer. In some embodiments, a teflon washer may be disposed or placed on top of the first layer, and the second layer may be placed on top of, or within, the teflon washer, and a spacer may be on top of the second layer, or second layer-teflon washer combination, acting as a current collector.

Referring to b and c, voltage profiles of the semi-solid cell described above are illustrated. Referring to b, the graph illustrates a voltage profile of a cell with 4M LiTFSI, where the voltage is maintained over multiple charges. Referring to c, the graph illustrates a voltage profile of a cell without 4M LiTFSI, where the voltage and capacity drop off after one charge cycle.

Figure 30:
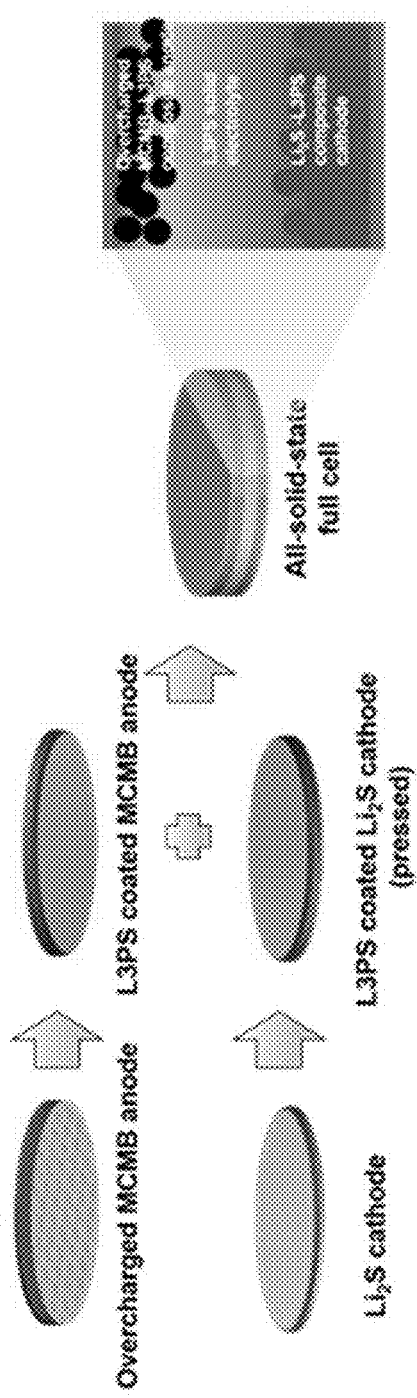
FIG. 30 illustrates a schematic for fabricating a solid-state fuel cell by solution-processing, in accordance with one embodiment of the present disclosure.

FIG. 30 illustrates a schematic for fabricating a solid-state fuel cell by solution-processing, in accordance with one embodiment of the present disclosure. As illustrated, an overcharged MCMB anode may be coated in L3PS and coupled to a $Li_2S$ cathode coated in L3PS to form an all-solid state fuel cell. Using solution-processing, the all-solid-state fuel cell may have an overcharged MCMB-L3PS composite anode separated from an $Li_2S$–L3PS composite cathode by a L3PS solid electrolyte.

Figure 31:
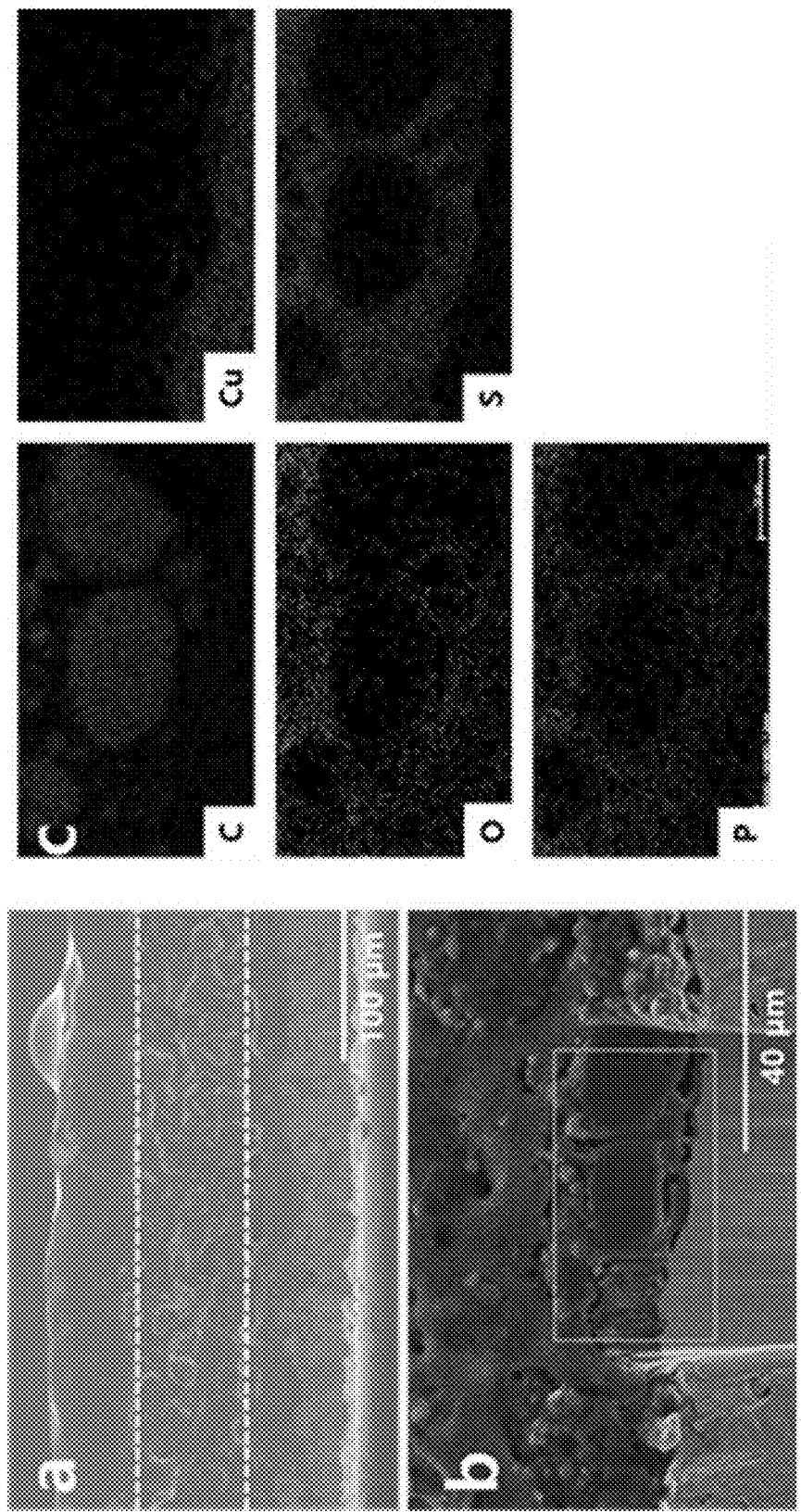
FIG. 31 illustrates images of solid electrolyte layer coated in an anode, in accordance with one embodiment of the present disclosure.

FIG. 31 illustrates images of solid electrolyte layer coated in an anode, in accordance with one embodiment of the present disclosure. As illustrated, a depicts a SEM cross-section image of a L3PS coated MCMB anode, as described in FIG. 30. As illustrated, b depicts a FIB-SEM cross-section image of the L3PS coated MCMB anode. As illustrated, c depicts an EDS elemental distribution image of C, Cu, O, S, and P of the same area depicted in b.

Figure 32:
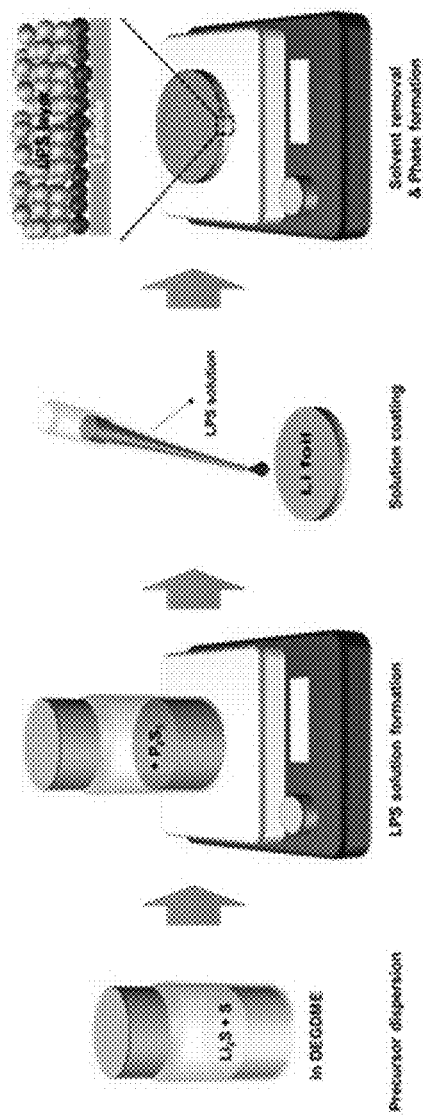
FIG. 32 illustrates a solution-processing method for synthesizing a solid sulfide electrolyte, in accordance with one embodiment of the present disclosure.

FIG. 32 illustrates a solution-processing method for synthesizing a solid sulfide electrolyte, in accordance with one embodiment of the present disclosure. As illustrated, dissolved polysulfides are prepared by mixing $Li_2S$ and S in DEGDME under stirring condition at room temperature. The amount of $Li_2S$ used may range from about 0.001 g to about 2.000 g. In embodiments, the amount of $Li_2S$ may be about 0.244 g. The amount of S used may range from about 0.001 g to about 2.000 g. In embodiments, the amount of S may be about 0.341 g. DEGDME may be chosen, at least for a relatively low boiling point, a high stability, and an appropriate dielectric property. The stirring may have been over a period of 8 hours to 40 hours. In embodiments, the time is 1 day.

The mixture may react with $P_2S_5$ to produce a liquid phase of a solid electrolyte. In particular, the solution forms $3Li_2S_3+1P_2S_5$, i.e., L3PS. In embodiments, The amount of $P_2S_5$ used may range from about 0.001 g to about 2.000 g. In embodiments, the amount of $P_2S_5$ used may be about 0.394 g. The solution may be stirred for 2-4 more days. In some embodiments, it may be 3 days.

The liquid phase is cast on Li metal (e.g., a Li chip) to form a sulfide solid electrolyte layer as residual solvent is dried. In some embodiments, the solution may be pre-dried in a vacuum for about 2 hours. In embodiments, the solution may be further dried in a vacuum furnace at about 140 degrees C. for about 12 hours. A person of ordinary skill in the art would recognize that different temperatures and times may be appropriate based on the application. Some S is lost during the drying process. L1PS may be formed using the same procedures with the exact stoichiometry, $3Li_2S+1P_2S_5$, for $Li_3PS_4$.

Figure 33:
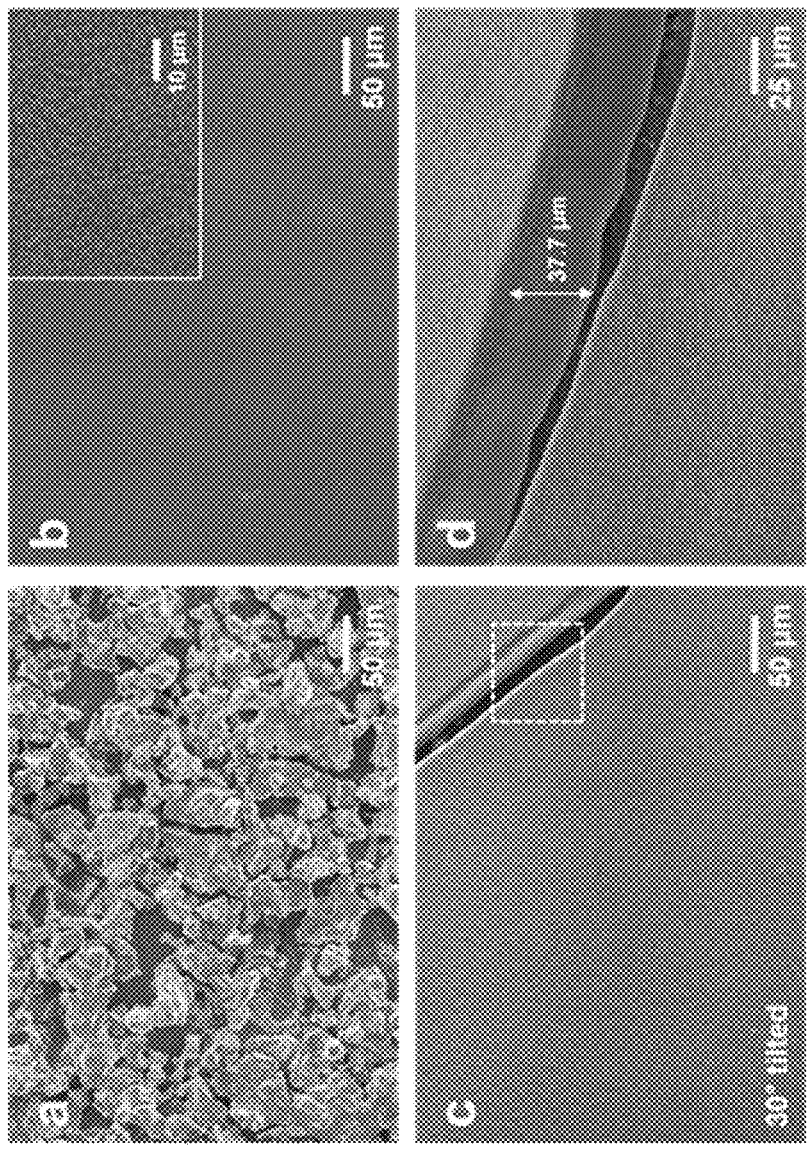
FIG. 33 illustrates images of solid electrolytes, in accordance with one embodiment of the present disclosure.

The different solution conditions for L1PS and L3PS may lead to significant morphological differences, as illustrated in FIG. 33. Referring to a, the interfacial contact between L1PS and the Li metal is poor, as depicted by the large gap between the two in the focus ion beam (FIB)-SEM image. Referring to b, L3PS forms a dense film on Li metal, such that the entire surface of the Li substrate is uniformly covered. The thickness of the film was measured in c and d, which is why the SEM image was tilted at 30 degrees at a crack in the L3PS. Based on the SEM images, the L3PS image is about 40 microns thick.

Figure 34:
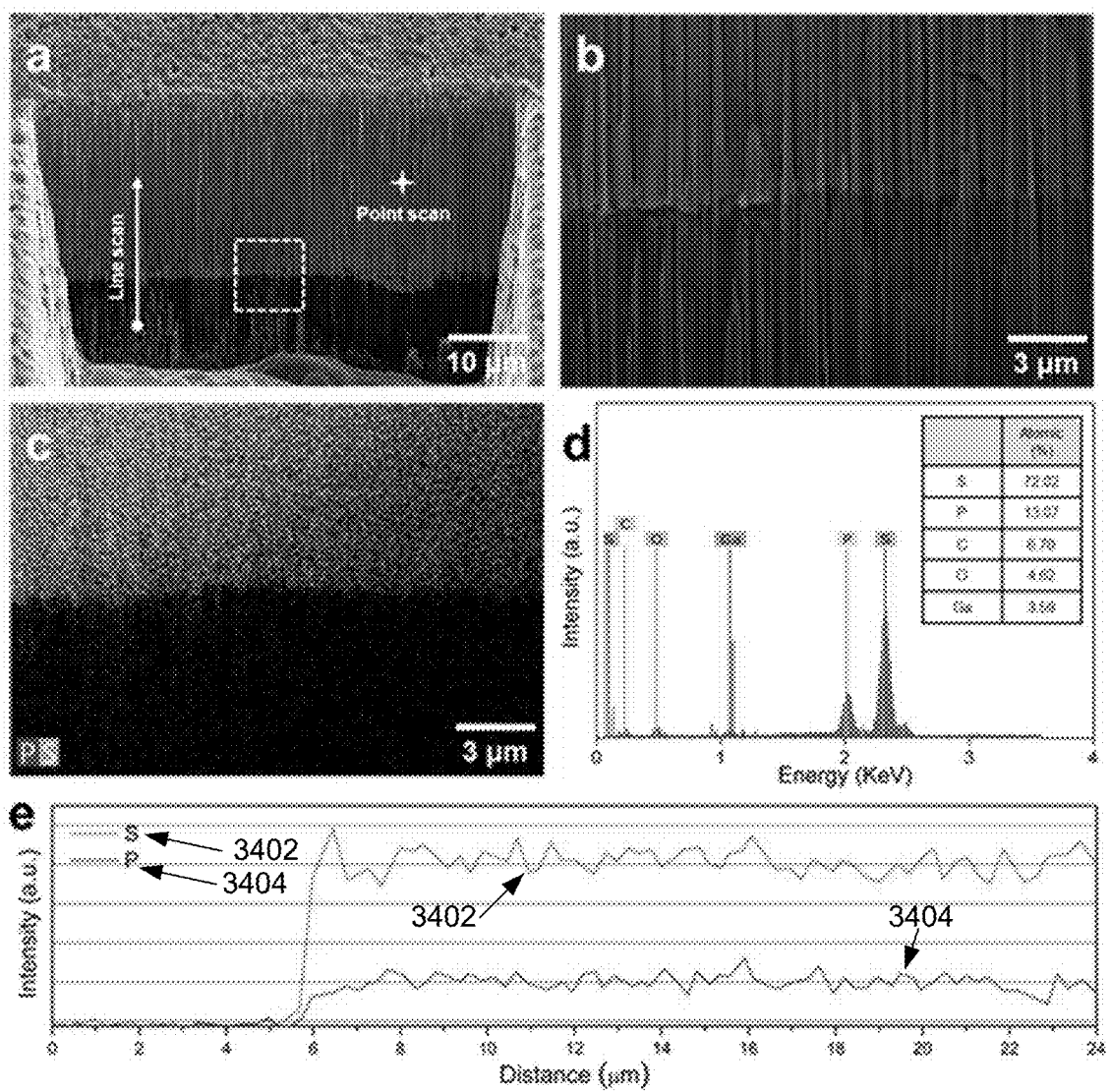
FIG. 34 illustrates images and characterizations of a solid electrolyte, in accordance with one embodiment of the present disclosure.

In FIGS. 34, a and b more clearly illustrate the uniform covering of the L3PS SE, depicting no gaps or voids. Referring to c, further illustrates a clean separation between the Li metal and the S and P in the L3PS is illustrated. The elemental composition is analyzed by focusing on the inner film, which indicates that L3PS mostly includes S and P, with a few other elements (e.g., C, O and Ga). As illustrated, e depicts homogeneity because the ratio between S 3402 and P 3404 remains substantially constant.

Figure 35:
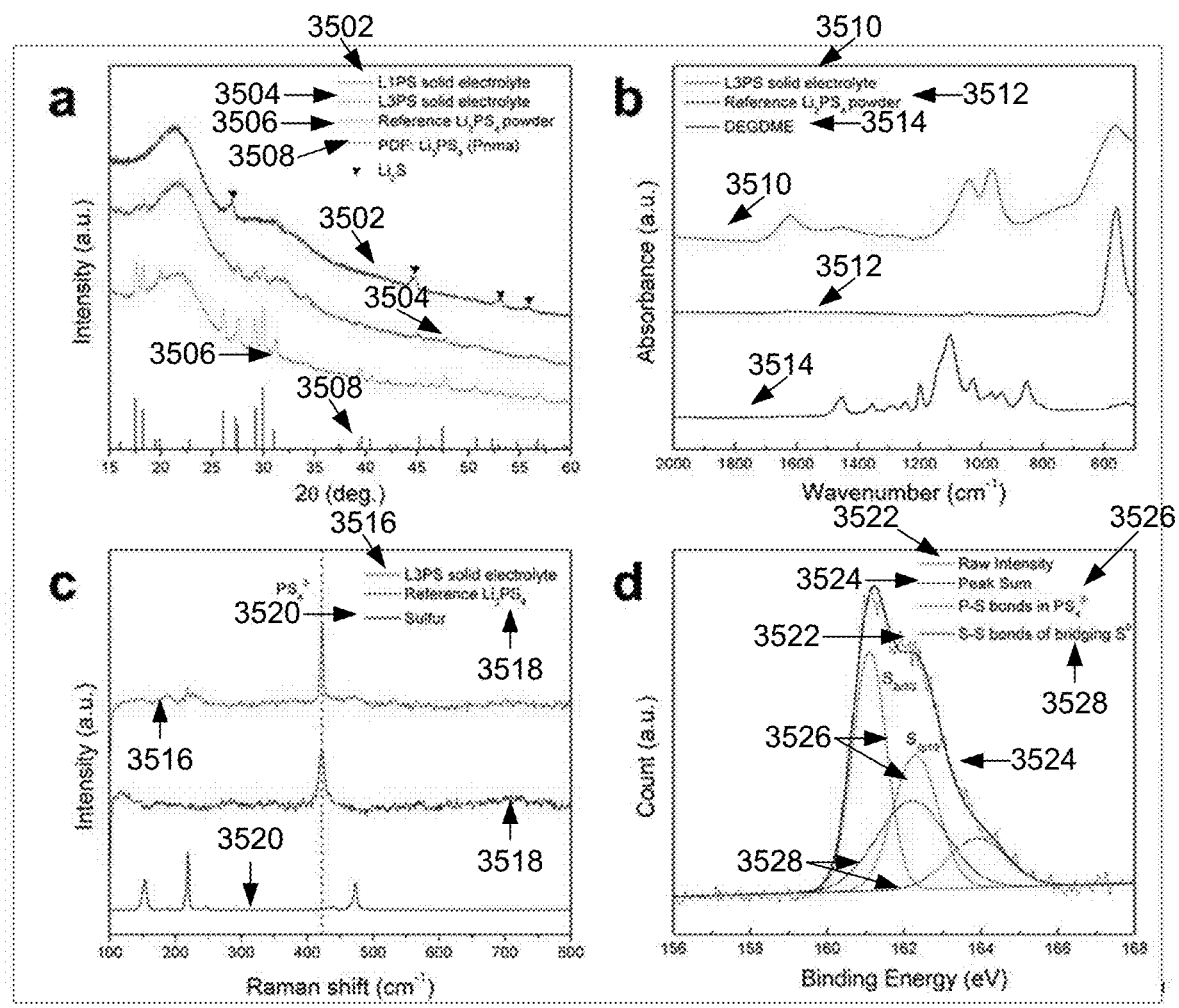
FIG. 35 illustrates characterizations of a solid electrolyte, in accordance with one embodiment of the present disclosure.

FIG. 35 illustrates compositional analysis of the $L_3PS$, in accordance with one embodiment of the present disclosure. As illustrated, a depicts x-ray diffraction (XRD) results that indicate L3PS correlates with $β-Li_3PS_4$, as the spikes in $Li_3PS_4$ 3506 and $Li_3PS_4$ 3508 correspond to similar peaks in L3PS 3504, whereas L1PS 3502 does not have the same spikes. This indicates L3PS is mostly composed of the conductive $β-Li_3PS_4$ phase. In b, a peak for L3PS 3510 at about 580 $cm^{-1}$ corresponds with the peak in $Li_3PS_4$ 3512 and no peaks with the solvent 3514, confirming the solvent's removal.

In c, a Raman analysis is shown to confirm formation of $Li_3PS_4$. The peak at 420 $cm^{-1}$ in L3PS 3516 may be attributed to the P—S vibration in the $PS_4^{3-}$ tetrahedral unit, which is characteristic of $Li_3PS_4$ 3518. Weak signals are also observed that correspond to S—S vibrations in $S^0$, implying the presence of elemental S 3520.

The graph in d further confirms that L3PS SE is primarily composed of $β-Li_3PS_4$ with small amounts of elemental S. The Gaussian-Lorentzian line-shape function is applied to de-convolute the S 2 p peaks 3526. The main signal 3522 is consistent with the P—S bond 3526 in the $PS_4^{3-}$ tetrahedral units in $β-Li_3PS_4$ and the doublet originates from the spin-orbit splitting at a 1:2 ratio of $S_{2p3/2}$ and $S_{2p1/2}$. S—S bonds 3528 from S bridging (S°) are also identified, which corroborates the results described above.

Figure 36:
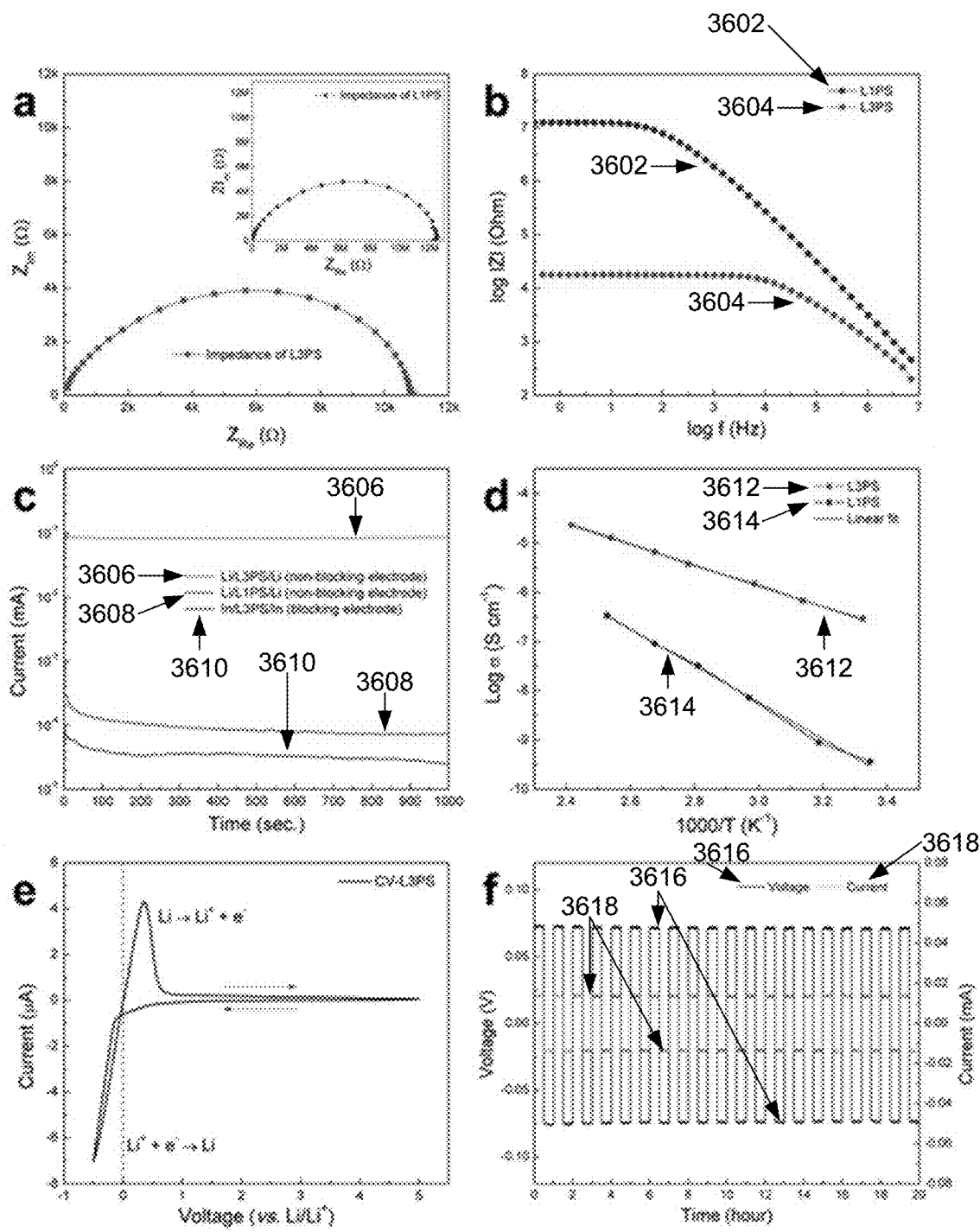
FIG. 36 illustrates evaluations of electrochemical properties of a solid electrolyte, in accordance with one embodiment of the present disclosure.

FIG. 36 illustrates electrochemical properties associated with L1PS and L3PS using Li/electrolyte/Li symmetric cells. As illustrated in a, L1PS has a high resistance and a lower conductivity than L3PS. This indicates there is non-conductive $Li_2S$ and poor interfacial contact with Li metal. L3PS has increased conductivity from conductive $β-Li_3PS_4$, enhancing ion conduction in the L3PS body and at the interface.

In b different ionic conduction behaviors based on the different slopes for L1PS 3602 and L3PS 3604 are illustrated. A graph of DC response under constant voltage at room temperature is depicted in c. As illustrated, when non-blocking electrodes are used, the steady current for L3PS 3606 stays around $10^{-1}$ mA, and the steady current for L1PS stays around $10^{-4}$. When blocking electrodes are used, the L3PS 3610 is significantly reduced, indicating the L3PS is a single ionic conductor with negligible electronic conductivity.

Arrhenius plots are illustrated in d, which may be used to determine an activation energy from ionic conductivities obtained under different temperatures. The activation energy of L3PS electrodes 3612 (40.21 kJ $mol^{-1}$) is much lower than that of L1PS electrodes 3614 (71.17 kJ $mol^{-1}$).

Cyclic voltammetry (CV), as illustrated in e, may be used to evaluate the electrochemical stability of the L3PS SE. The peak around 0 V indicates high stability of L3PS SE. In f, a graph of cycling the L3PS symmetric cell and the change in voltage 3616 and current 3618 is depicted. As illustrated, the voltage is constant through multiple charges and discharges.

Figure 37:
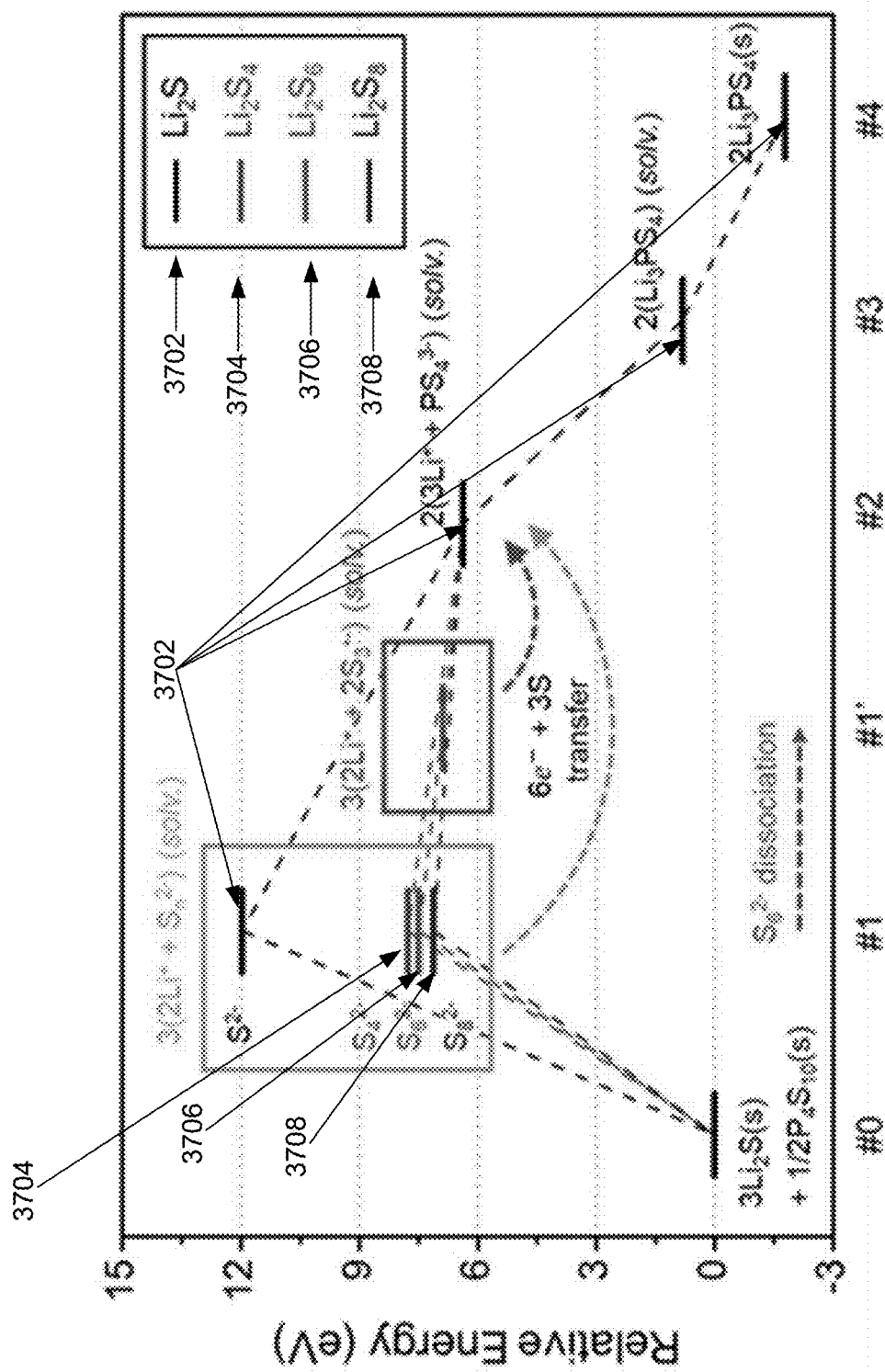
FIG. 37 illustrates reaction thermodynamics for formation of $2Li_3PS_4$, in accordance with one embodiment of the present disclosure.

FIG. 37 illustrates reaction thermodynamics for formation of $2Li_3PS_4$, in accordance with one embodiment of the present disclosure. When polysulfides are dissolved in DEGDME, polysulfides form a variety of species, such as, for example, $S_4^{2-}$, $S_6^{2-}$–$S8^{2-}$, $S_3^-$. In particular, polysulfides may be thermodynamically favored to react with $P_2S_5$ to form $Li_3PS_4$. The polysulfide anions dissolved in solution may transfer S atoms and electrons to ½$P_4S_{10}$ molecule to finally make $2PS_4^{3-}$ anions. In order to improve the likelihood of forming L3PS intermediate polysulfides may be introduced to reduce the thermodynamic barrier to form $Li_3PS_4$.

FIGS. 38-41 correspond to testing and images of a solution-based synthesis using a nucleophilic agent. For example, the nucleophilic agent used to synthesize a $Li_2S$ $P_2S_5$ solid electrolyte may be $LiSC_2H_5$. The nucleophilic agent may be able to help break the P—S bonds of the $P_2S_5$, allowing the $P_2S_5$ to fully dissolve in THF to form soluble intermediates. In some embodiments, 10 g of THF solvent is used in dissolving different molar ratios of $P_2S_5$ and $LiSC_2H_5$, such as 1:0.1, to 1:10. In embodiments, the molar ratio between $P_2S_5$ and $LiSC_2H_5$ may be 1:1 which optimizes the residue of $LiSC_2H_5$ while fully dissolving $P_2S_5$. As a result, the $P_2S_5$ may be able to react with the insoluble $Li_2S$, forming a high quality $\beta$-$Li_3PS_4$ solid electrolyte ($1.32 \times 10^{-4}$ S cm$^{-1}$) with a uniform particle shape.

Figure 38:
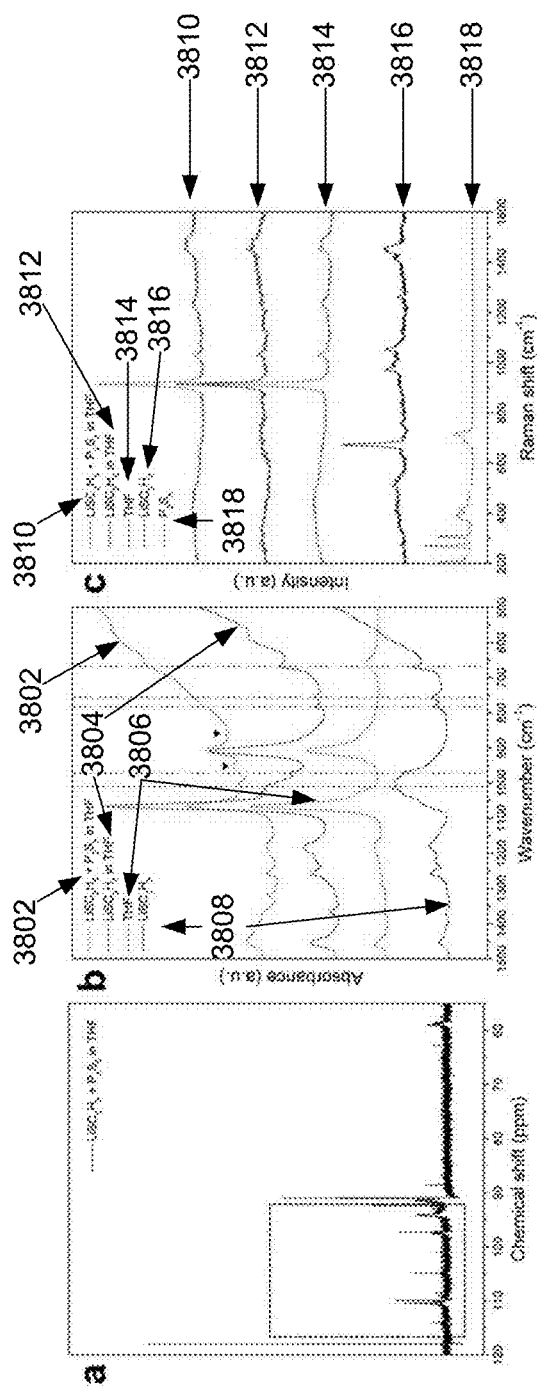
FIG. 38 illustrates analyses of THF dissolving various compositions, in accordance with one embodiment of the present disclosure.

FIG. 38 illustrates analyses of THF dissolving various compositions, in accordance with one embodiment of the present disclosure. As illustrated, a of FIG. 38 is a phosphorous nuclear magnetic resonance (P-NMR) of a solution including about 10 g THF, and about a 1:1 ratio of $P_2S_5$ and $LiSC_2H_5$. The first peak at about 57.3 ppm indicates the presence of $P_2S_5$. The additional peaks at about 88 ppm and about 118 ppm are attributed to $P(SR)_3$ and $PS_4^{3-}$, indicating P—S bonds are broken. The peaks from about 90 ppm to about 110 ppm indicate P bonding features in the solution. As illustrated, b of FIG. 38 is a FT-IR of the solution. The characteristics of $LiSC_2H_5$ 3808 and THF 3806 merge in the solution of $LiSC_2H_5$ and THF. When $P_2S_5$ is added to the solution 3802, additional characteristics appear as other peaks are reduced, indicating P—S bonds are broken; c of FIG. 38 further corroborates this.

As illustrated, $P_2S_5$ 3818 includes multiple peaks in about the 200 cm$^{-1}$ to about 500 cm$^{-1}$. $LiSC_2H_5$ 3816 includes one large peak at about 650 cm$^{-1}$. When $LiSC_2H_5$ is added to THF 3812, the characteristic peak of $LiSC_2H_5$ 3816 disappears. In the $LiSC_2H_5$, $P_2S_5$, and THF solution 3810, both the characteristic peak of $LiSC_2H_5$ 3816 and $P_2S_5$ 3818 disappear, indicating that the nucleophilic agent, $LiSC_2H_5$, helps break P—S bonds.

Figure 39:
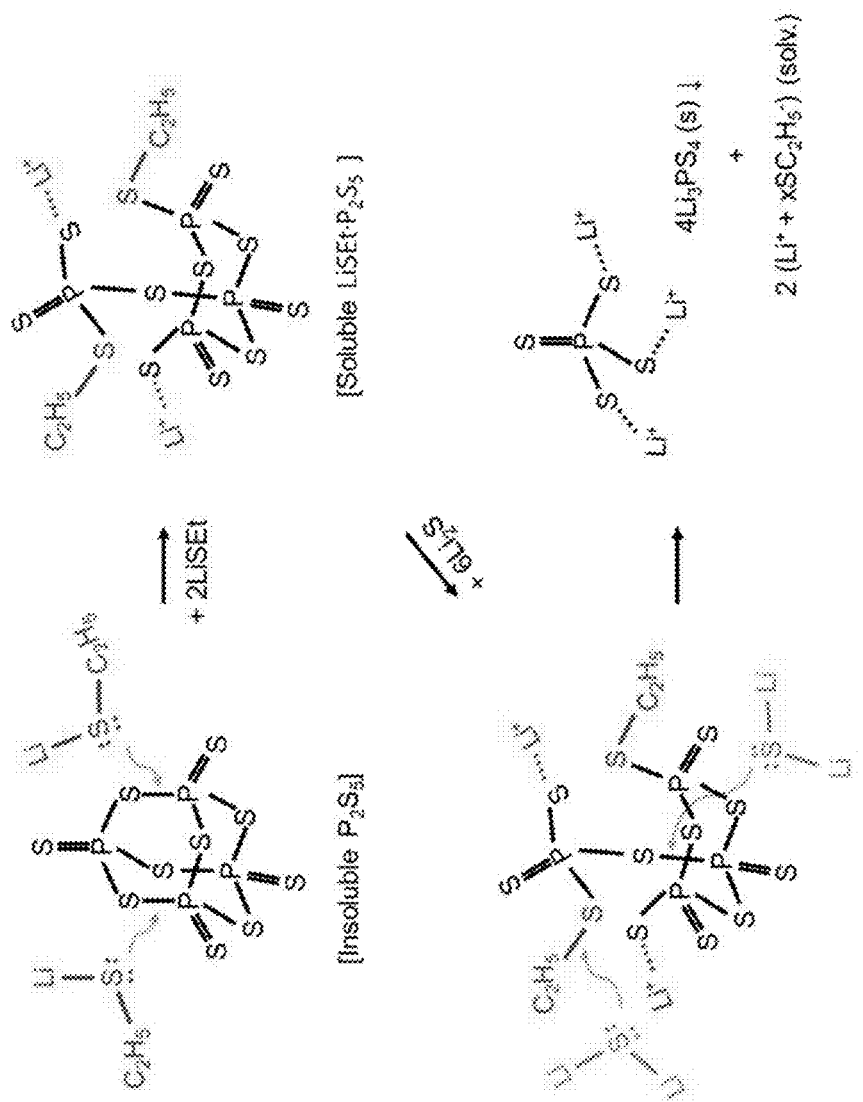
FIG. 39 illustrates the processes for forming $Li_3PS_4$, in accordance with one embodiment of the present disclosure.

FIG. 39 illustrates the processes for forming $Li_3PS_4$, in accordance with one embodiment of the present disclosure. As illustrated, two moles of $LiSC_2H_5$ are used to react with one mole of insoluble $P_4S_{10}$ to form a soluble $LiSC_2H_5$ $P_4S_{10}$. Six moles of $LI_2S$ are added to form 4 moles of $Li_3PS_4$.

Figure 40:
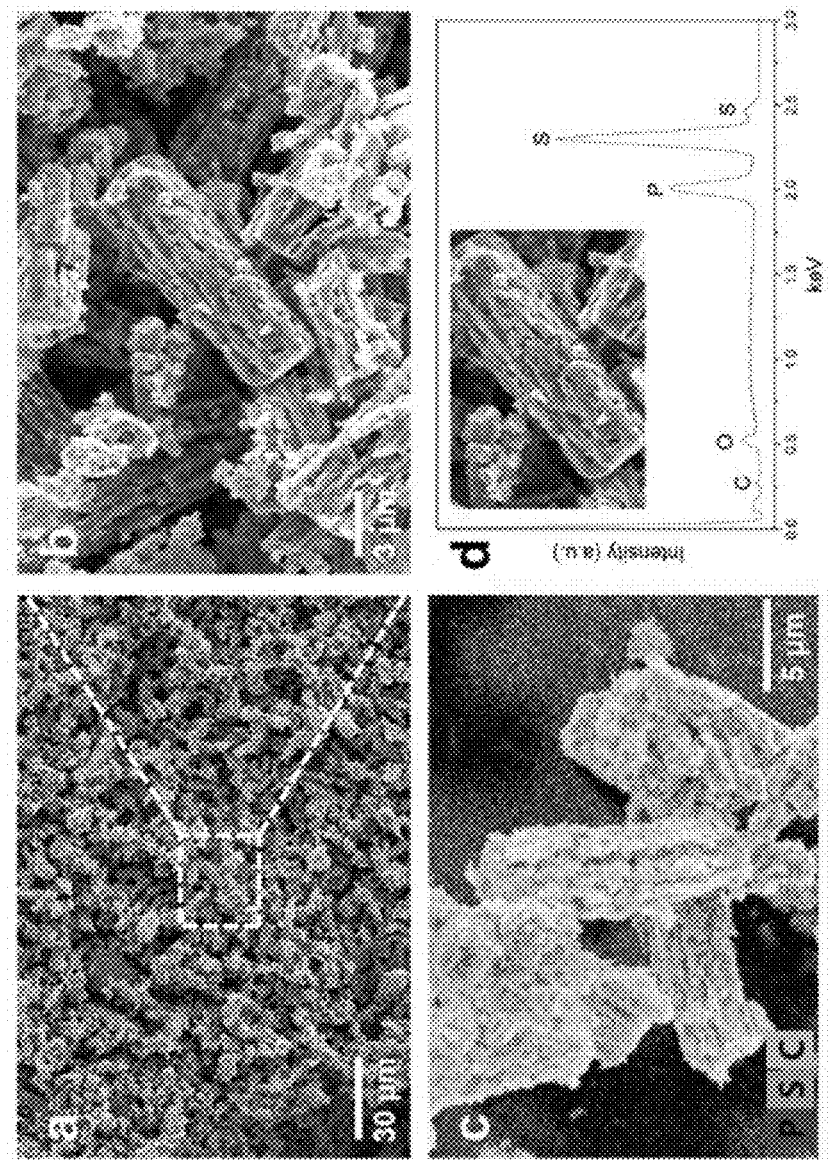
FIG. 40 illustrates images of $LiSC_2H_5$ $Li_3PS_4$, in accordance with one embodiment of the present disclosure.

FIG. 40 illustrates images of LiSEt@$Li_3PS_4$, in accordance with one embodiment of the present disclosure. As illustrated, a and b of FIG. 40 are SEM images of the synthesized $LiSC_2H_5$ $Li_3PS_4$ SE. As illustrated, c and d of FIG. 40 are EDS elemental maps indicating the concentrations of C, O, P, and S. The minimal amounts of C and O confirm that $LiSC_2H_5$ is removed, or otherwise filtered out, after the reaction.

Figure 41:
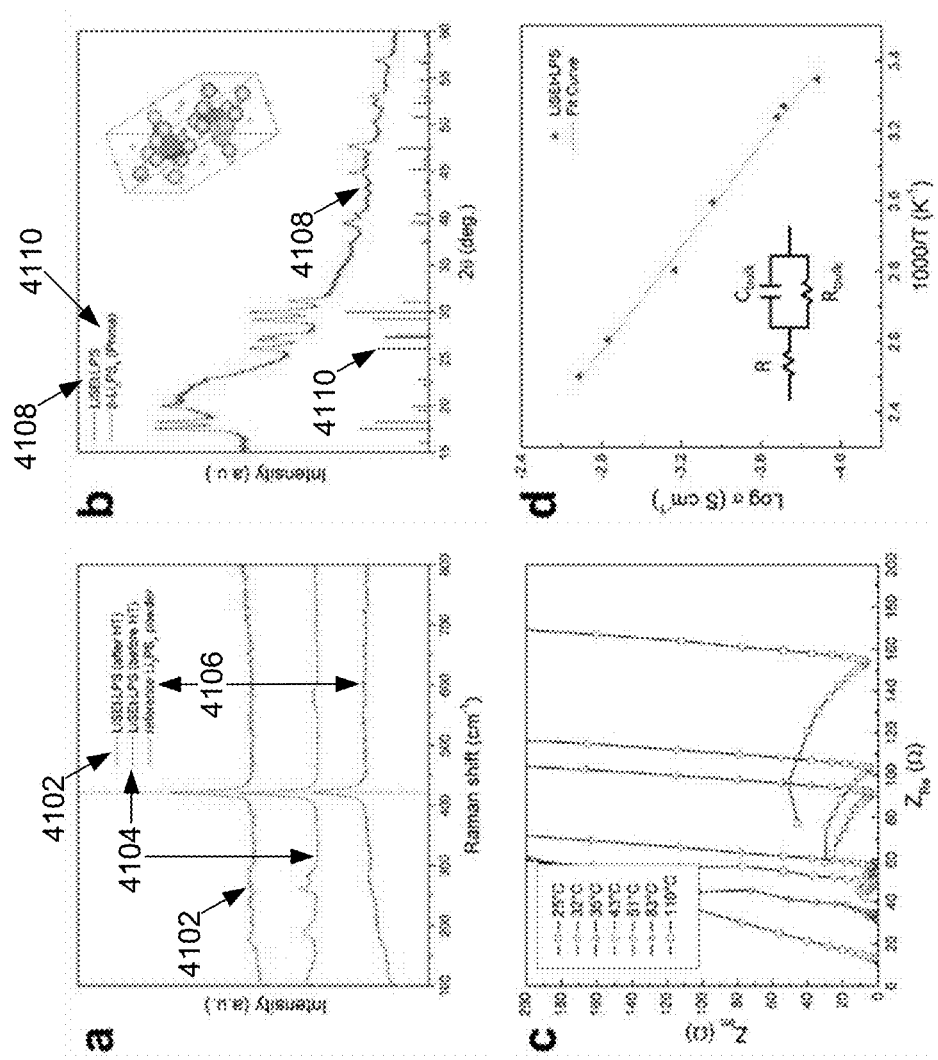
FIG. 41 illustrates graphs of $LiSC_2H_5$ $Li_3PS_4$, in accordance with one embodiment of the present disclosure.

FIG. 41 illustrates graphs of $LiSC_2H_5$ $Li_3PS_4$, in accordance with one embodiment of the present disclosure. As illustrated, a of FIG. 41 illustrates a Raman spectra with a dominant peak around 420 cm$^{-1}$ for the $LiSC_2H_5$ LPS after heating 4102, before heating 4104, and a reference $Li_3PS_4$ powder 4106. This indicates the formation of tetrahedral units of $PS_4^{3-}$ and that the product includes mostly conductive $\beta$-$Li_3PS_4$. This is further corroborated in b of FIG. 41, where the $LiSC_2H_5$ LPS 4108 peaks match most of the peaks of the $\beta$-$Li_3PS_4$ 4110 peaks in the XRD spectra. A blocking electrode cell was used in c and d of FIG. 41; c illustrates EIS results over different temperatures, where conductivity is highest at room temperature (e.g., about $1.32 \times 10^{-4}$ S cm$^{-1}$) and drops as temperature increases, more easily depicted in the Arrhenius plot of d. The activation energy was determined to be about 25.93 kJ/mol.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A self-forming battery component, consisting essentially of:
   a cathode material;
   an anode material; and
   a catholyte layer comprising a cross linkable polymer created by a vulcanization reaction between the cathode material and a polymer chain.

2. The self-forming battery component of claim 1, wherein the cathode material comprises alloys of alkali and alkaline-earth reductive metals.

3. The self-forming battery component of claim 1, wherein the anode material stores at least one of graphite, hard carbon, $Li_4Ti_5O_{12}$, Si, Sn, and Al.

4. The self-forming battery component of claim 2, further comprising a material to react with the alkaline-earth reductive metals, where the material may comprise at least one of oxyhalide, a compound containing sulfur, carbon halide, nitrate, metal halide, sulfides, mixed sulfides, and metal nitrates.

5. The self-forming battery component of claim 1, wherein the catholyte layer comprises an ionic conductor.

6. The self-forming battery component of claim 1, wherein the self-forming battery component comprises $xLi_2S_{1+y}:P_2S_5$, where x ranges from 1 to 5, and y ranges from 0 to 7.

7. The self-forming battery component of claim 6, wherein x ranges from 7/3 to 3, and y ranges from 0 to 0.5.

8. The self-forming battery component of claim 5, further comprising compounds, wherein the compounds comprise LiI, LiBr, LiCl, $LiNO_3$, $LiNO_2$, and LiF.

9. The self-forming battery component of claim 1, further comprising a solvent comprising at least one of tetra ethylene glycol dimethyl ether (TEGDME), dimethyl ether (DME), and diethylene glycol dimethyl ether (DEGDME).

10. The self-forming battery component of claim 1, wherein the cross linkable polymer comprises a ratio of more than 0.01 wt % of the cross-linkable polymer in a cathode-polymer solution and less than 99.99 wt % of the cross-linkable polymer in the cathode-polymer solution.

* * * * *